US009720439B2

(12) United States Patent
Tennant

(10) Patent No.: US 9,720,439 B2
(45) Date of Patent: Aug. 1, 2017

(54) METHODS, APPARATUSES, AND SYSTEMS FOR DESKEWING LINK SPLITS

(71) Applicant: Intel Corporation, Santa Clara, CA (US)

(72) Inventor: Bruce A. Tennant, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,866

(22) Filed: Sep. 26, 2015

(65) Prior Publication Data

US 2017/0090510 A1    Mar. 30, 2017

(51) Int. Cl.
*G06F 1/10*    (2006.01)
*G06F 1/12*    (2006.01)

(52) U.S. Cl.
CPC . *G06F 1/10* (2013.01); *G06F 1/12* (2013.01)

(58) Field of Classification Search
CPC ..................................... G06F 1/10; G06F 1/12
See application file for complete search history.

(56) References Cited

U.S. PATENT DOCUMENTS

| 4,731,676 | A * | 3/1988 | Berlekamp | ........ G11B 20/1407 360/26 |
| 7,054,331 | B1 * | 5/2006 | Susnow | .................. H04L 25/14 370/465 |
| 7,225,354 | B2 * | 5/2007 | Tseng | .................... G06F 13/385 713/503 |
| 7,466,723 | B2 | 12/2008 | Vakil | |
| 7,913,001 | B2 | 3/2011 | Renaud | |
| 9,058,266 | B2 | 6/2015 | Choi | |
| 2005/0141661 | A1 | 6/2005 | Renaud | |
| 2006/0092969 | A1 | 5/2006 | Susnow et al. | |
| 2006/0282719 | A1 | 12/2006 | Damodaran | |
| 2008/0130814 | A1 * | 6/2008 | Li | ....................... G06F 13/4217 375/372 |
| 2011/0066771 | A1 | 3/2011 | Renaud | |
| 2014/0112339 | A1 | 4/2014 | Safranek et al. | |
| 2014/0167825 | A1 | 6/2014 | Dobbs et al. | |

FOREIGN PATENT DOCUMENTS

WO    2017052908    3/2017

OTHER PUBLICATIONS

International Search Report and Written Opinion issued in PCT Application No. PCT/US2016/048255 on Nov. 28, 2016; 9 pages.

* cited by examiner

*Primary Examiner* — Stefan Stoynov
(74) *Attorney, Agent, or Firm* — Patent Capital Group

(57) ABSTRACT

Systems, methods, and apparatuses are described for deskewing between multiple lane groups of deskewed data streams. Multiple distinct and deskewed lane groups can be aligned by utilizing an inter-group synchronized set of counters. The counters supply a way to measure the time delta (counter difference) in clocks between the multiple streams. Using this delta, one or more streams can be stalled to align the multiple streams. The counter values are communicated between the multiple groups in a way that they align to set data stream markers. These fixed markers and the breaking up of the counters in relation to the periodicity of the markers allows for a robust way to compare the multiple streams and calculate an accurate time delta.

22 Claims, 16 Drawing Sheets

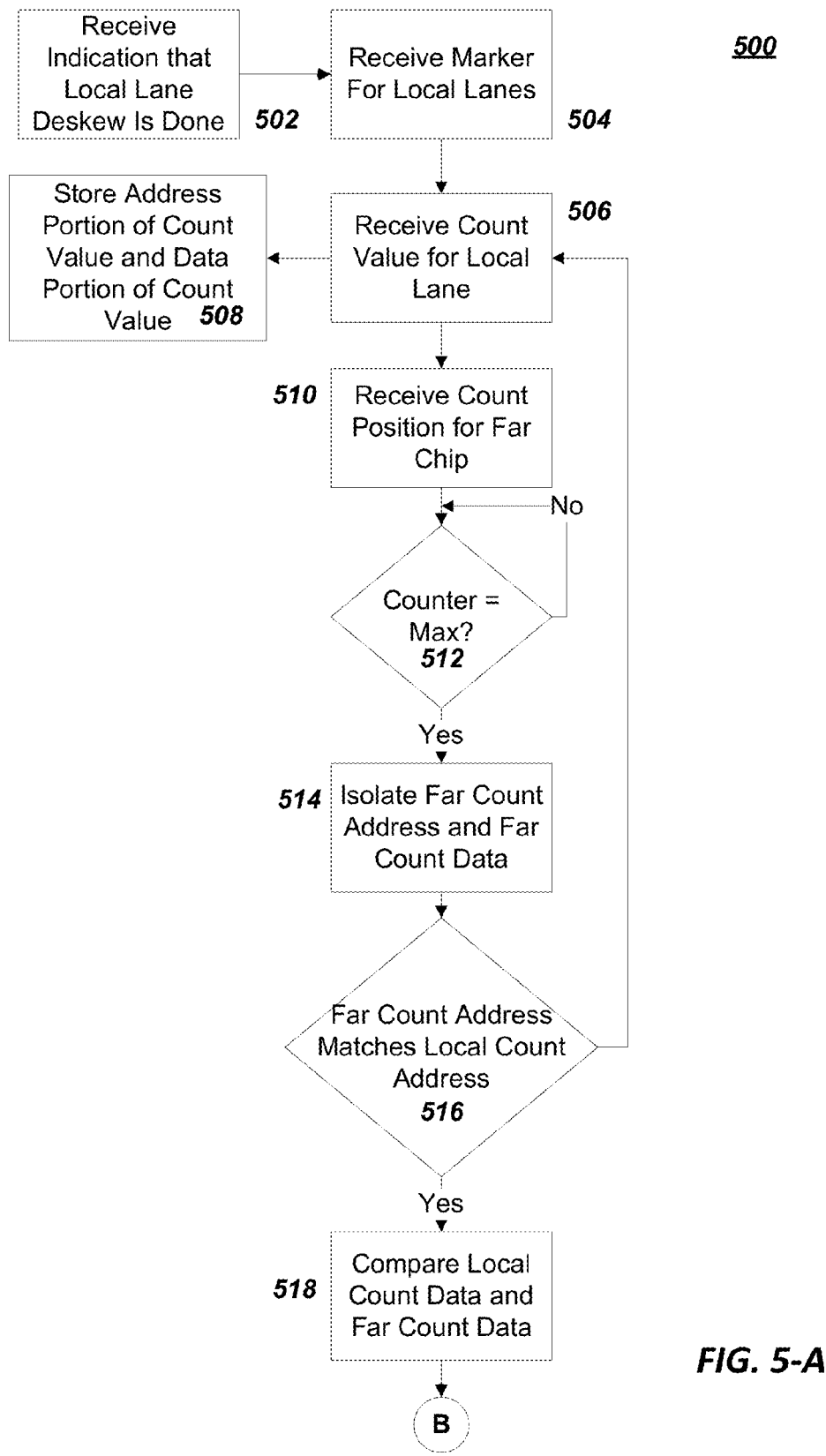
FIG. 5-A

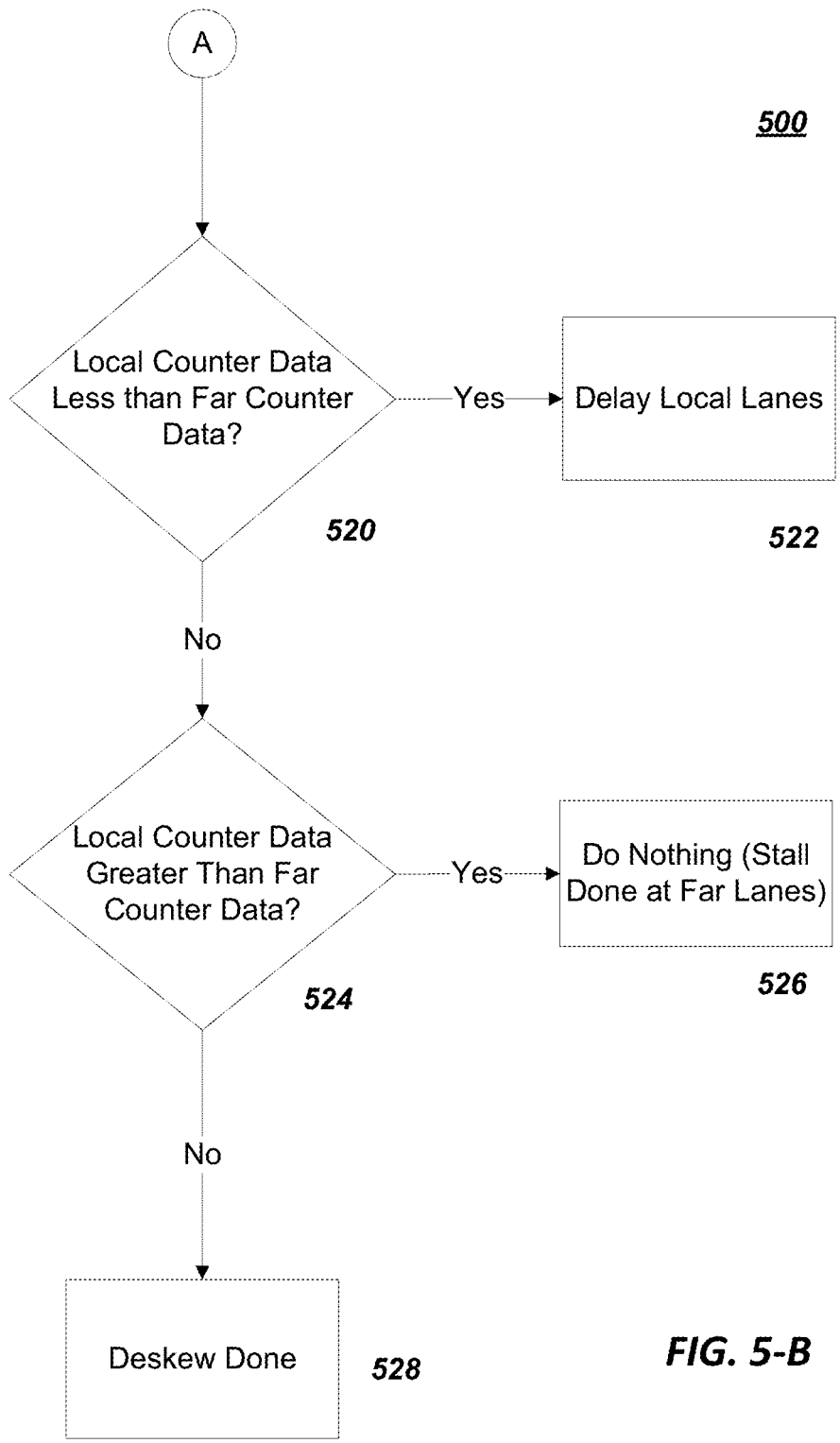
FIG. 5-B

METHODS, APPARATUSES, AND SYSTEMS FOR DESKEWING LINK SPLITS

FIELD

This disclosure pertains to computing system, and in particular (but not exclusively) to deskewing link splits over more than one chip.

BACKGROUND

Data streams, or lane groups, can undergo clock skewing, thereby desynchronizing arrival times among the lanes at target destinations. Lanes within a lane group can be deskewed using various techniques. In cases where different chips reside on a single card, each chip having disparate lane groups, the different lane groups may also undergo clock skewing, desynchronizing the lane groups associated with different chips on a single card (or on more than one card).

BRIEF DESCRIPTION OF THE DRAWINGS

FIG. 5-A is a process flow diagram for deskewing disparate lanes in accordance with embodiments of the present disclosure.

FIG. 5-B is a continuation of a process flow diagram 5-A for deskewing disparate lanes in accordance with embodiments of the present disclosure.

DETAILED DESCRIPTION

Figure 1:
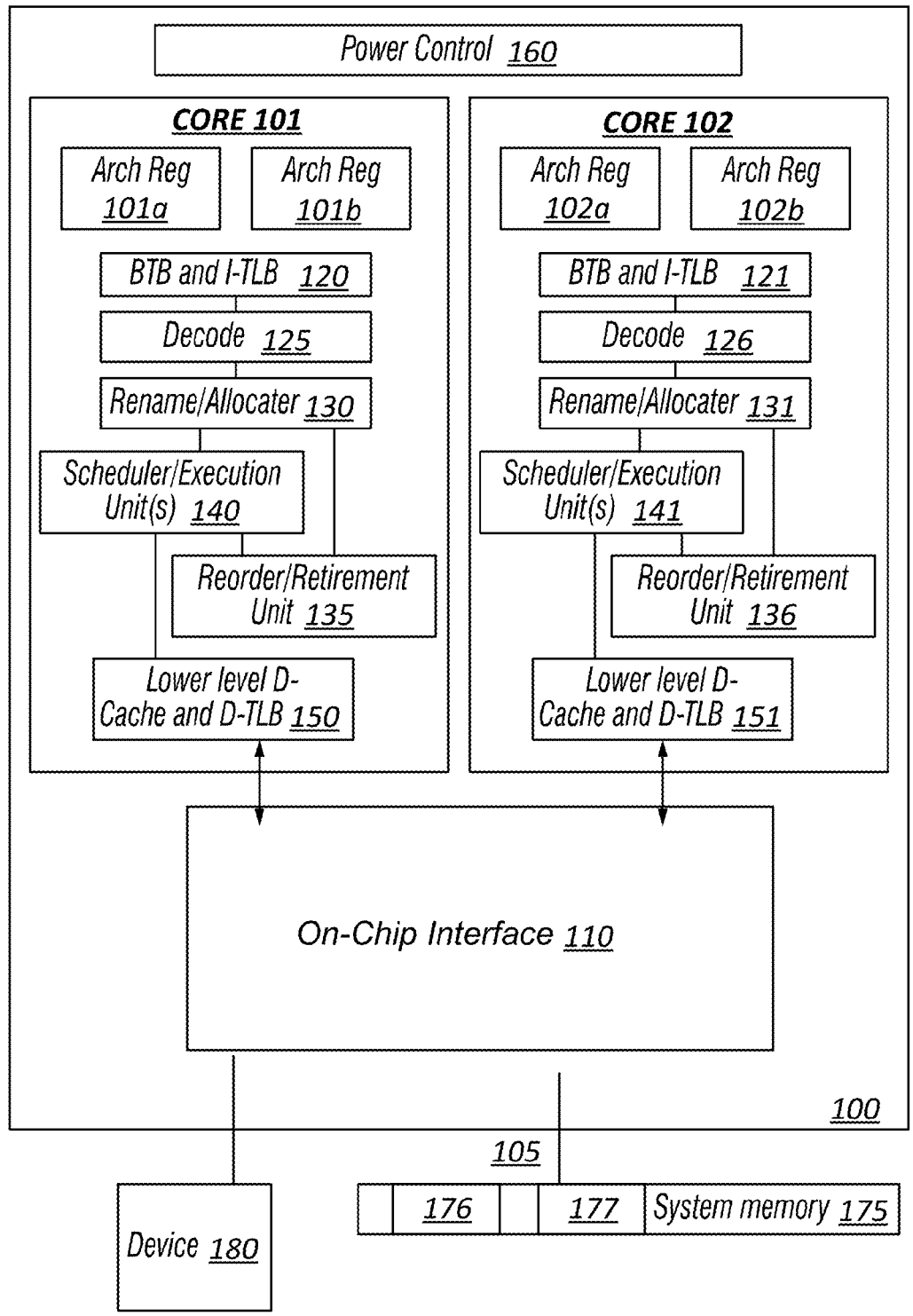
FIG. 1 illustrates an embodiment of a block diagram for a computing system including a multicore processor.

Systems, methods, and apparatuses are described for deskewing between multiple (e.g., at least two) lane groups of deskewed data streams. Multiple integrated circuit chips can be supported on a single card. Each chip can receive streams of data (referred to as a lane group) destined for transmission across an interconnect link, such as a PCIe interconnect link. Prior to transmission across the interconnect link, however, the lane groups of each chip is to be deskewed so that all streams of data from all chips on a single card can be transmitted across the interconnect. Multiple distinct and deskewed lane groups can be aligned by utilizing an inter-group synchronized set of counters. The counters supply a way to measure the time delta (counter difference) in clocks between the multiple streams. Using this delta, at least one of the streams can be stalled to align the multiple streams. The counter values are communicated between the multiple lane groups in a way that they align to set data stream markers. These fixed markers and the breaking up of the counters in relation to the periodicity of the markers allows for a robust way to compare the multiple lane groups and calculate an accurate time delta.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic (e.g., circuits or code) for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

FIG. 1

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

This disclosure describes time-synchronizing multiple distinct groups of data streams, also referred to as lane groups. Lane groups should be time-synchronized such that they may be re-transmitted with minimal skew. In some implementations, two PCIe lane groups are separated in such a manner that traditional intra-chip logic methods will not work to time-synchronize the lane groups (e.g., PCIe lane groups that are on distinctly packaged chips).

Aspects of the embodiments are directed to time-aligning multiple distinct lane groups by utilizing an inter-group synchronized set of counters. It is assumed that each lane group has undergone deskewing so that individual lanes within the lane group are synchronized.

The inter-group synchronized counters provide a way to measure the time difference in clocks between the multiple lane groups. The counter values are communicated between the multiple groups in a way that they align to set data stream markers. Using this time difference ($T_\Delta$), one or more lane groups can be stalled to time-align the multiple lane groups together.

Figure 2:
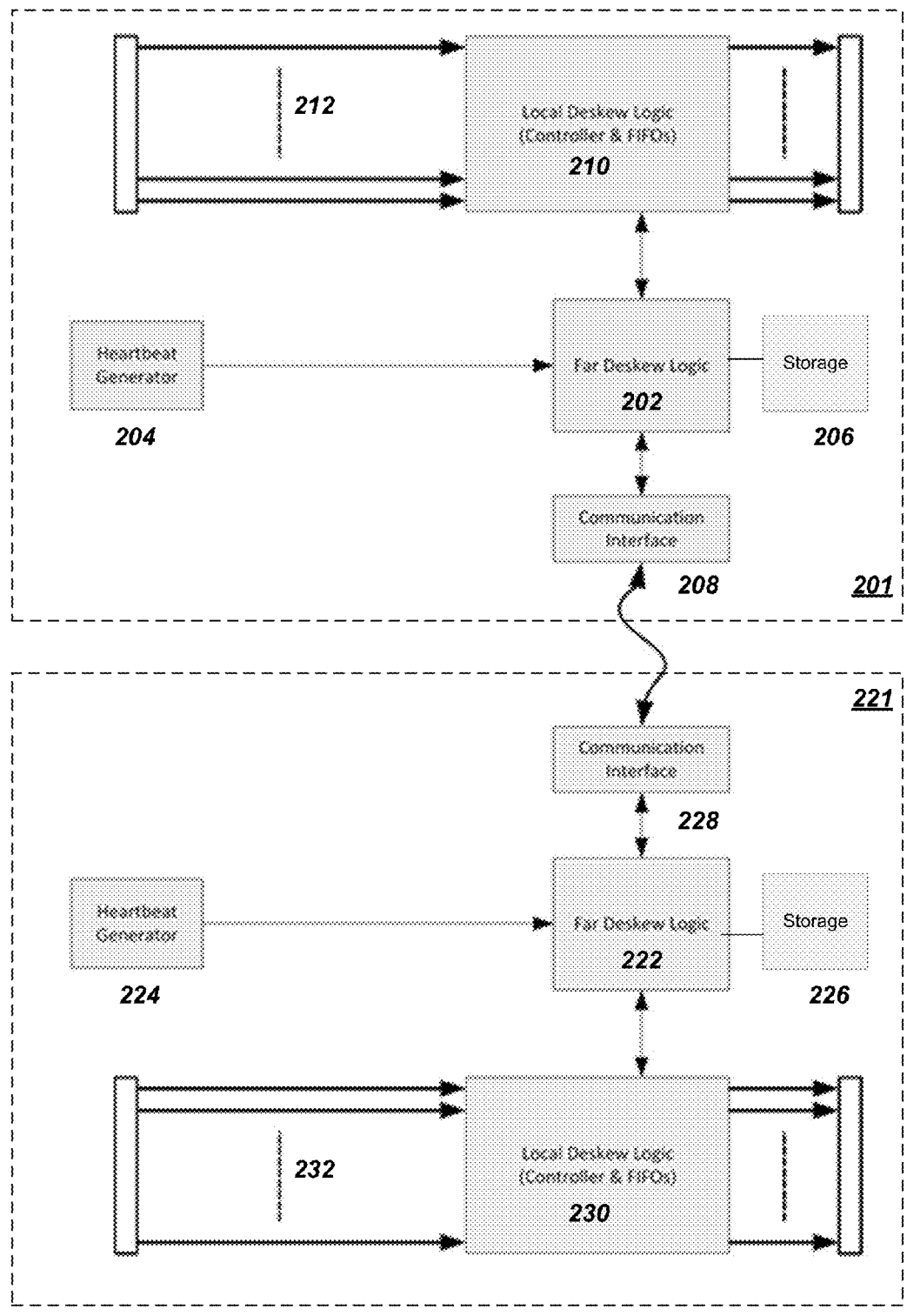
FIG. 2 is a schematic block diagram of a system for deskewing disparate lanes in accordance with embodiments of the present disclosure.

FIG. 2 is a schematic block diagram of a system 200 for deskewing disparate lane groups. System 200 shows two sets of circuits for each disparate lane group: the circuit sets referred to herein as "local circuit set" 201 and a "remote circuit set" 221. The terms "local" and "remote" are used to distinguish between operations that occur for local lane group 212 ("local" in this example) and remote lane group 232 ("remote" in this example). But one of ordinary skill would recognize that each circuit set may include the same or similar features.

Referring to local circuit set 201: Local circuit set 201 includes a local deskew logic 210 that first deskews local lane group 212, which is done in a known manner, such as utilizing COM symbols or 128/130 block starts as marker points. This local deskew is performed on lanes forming lane group 212 prior to deskewing between local lane group 212 and remote lane group 232. Once the local lane groups are deskewed, local deskew logic 210 sends an indication to the far deskew logic 202 that local deskew has been performed and that the far deskew logic 202 can perform deskewing between lane groups 201 and 221. Far deskew logic 202 is uses the term "far" because the far deskew logic 202 will use values received from the remote circuit set 221 as well as values from local circuit set 201, and in some instances, far deskew logic 202 may provide information to near lane group 212 to stall.

Local logic set 201 also includes a heartbeat generator 204, which can be a free running counter, 8 bit counter, or other counter logic. In one embodiment, the heartbeat generator 204 continuously provides local counter values to the far deskew logic 202. Local counter values can be 8 bits representing the position of the local lane group. In an alternate embodiment, the heartbeat generator 204 provides local counter values to the far deskew logic 202 at pre-defined time interval. Local logic set 201 also includes a storage logic 206 for storing address portions and data portions of counter values. Local logic set 201 also includes a communication interface 208 to interface between the local logic set 201 and the remote logic set 221.

Similarly, remote logic set 221 includes a far deskew logic 222, a heartbeat generator 224, a storage logic 226, a communications interface 228, and a local deskew logic 230. For remote logic set 221, the heartbeat generator 224 outputs a "far counter value" that can be transmitted to the local logic set 201. The far counter value is the counter value used by the far deskew logic 222 to identify the position of the streams of data of remote lane group 232.

In some embodiments, the local logic set 201 includes a storage structure 206 that logs local count values as the marker points go by. By matching the far count to its corresponding local count at the time the far count was captured, the system 200 ensures that clock cycle stalls, such as one clock cycle stalls, do not cause bad results. PCIE 128/130 internal data paths typically incur a cycle stall as a side effect of stripping the two block headers out of the data stream.

Figure 3:
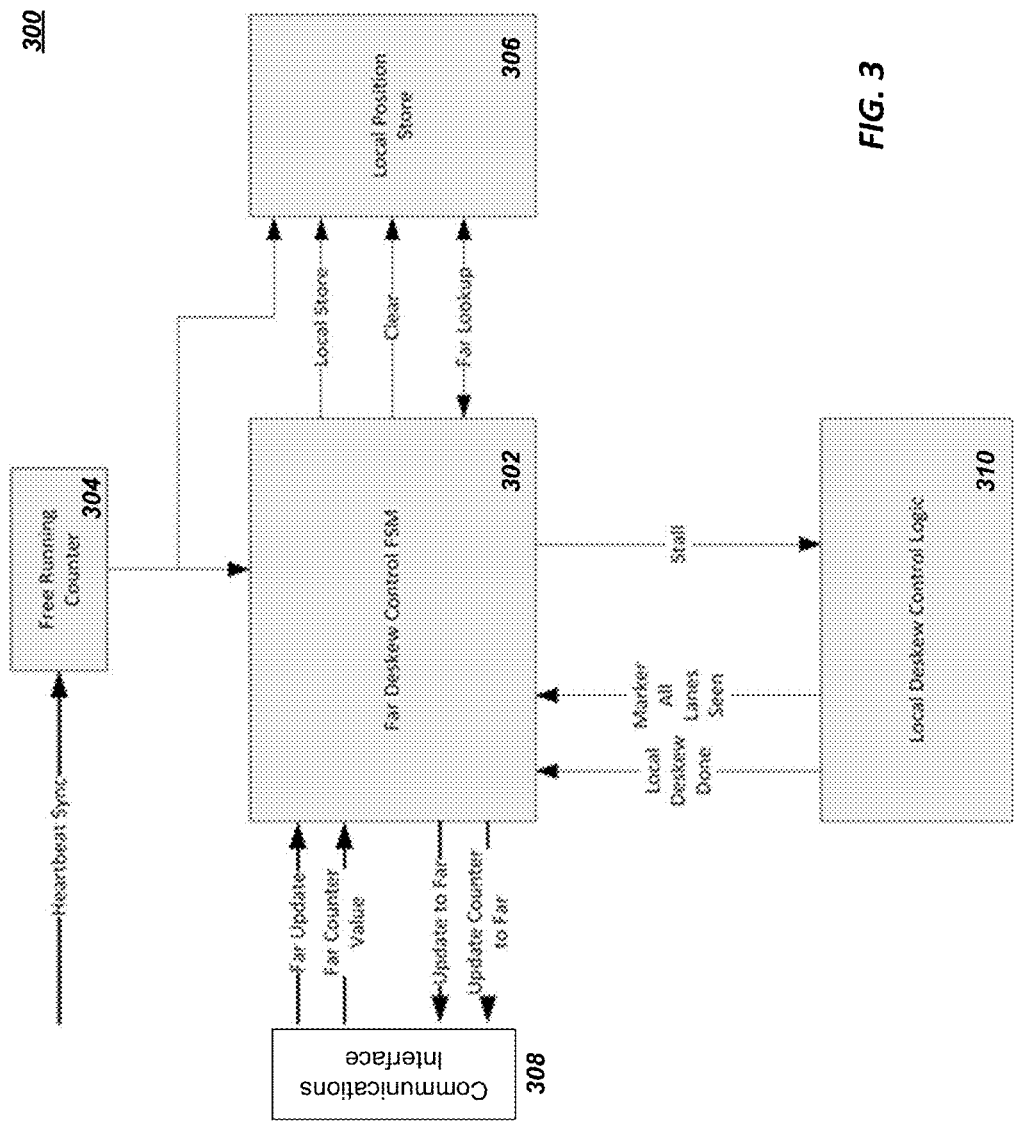
FIG. 3 is a schematic block diagram of a deskewing logic in accordance with embodiments of the present disclosure.

FIG. 3 is a schematic block diagram of a logic set 300 for deskewing between disparate lane groups in accordance with embodiments of the present disclosure. Specifically, logic set 300 can be the same or similar to local logic set 201 or remote logic set 221. For example, logic set 300 includes a far deskew logic 302, a free running counter 304, a storage logic 306, a communications interface 308, and a local deskew control logic 310. The local deskew control logic 310 interfaces directly with the lane group, such as local deskew logic 210 does with lane group 212 from FIG. 2.

Local deskew logic 310 can transmit signals to the far deskew logic 302, such as signals indicating that local deskew is completed. The far deskew logic 302 can use the presence of local deskew done indicator to start the deskew process. Far deskew logic 302 may include a finite state machine and/or other logic.

Additionally, the local deskew logic 310 can send a marker to the far deskew logic 302 that indicates that all lanes of a lane group have been seen by the local deskew logic 310. The marker can be a signal indicating the presence of a training sequence, such as the first symbol of a training sequence. A training sequence can be data representing data to be transmitted across the PCIe link. The marker can be used to signal to the far deskew logic 302 to begin the deskew process.

For example, a counter 304 is freely running, and outputs a local counter value. When the far deskew logic 302 detects a marker and the value of the counter 304 is within a threshold value, the far deskew logic 302 can store the counter value in the storage logic 306 and can update the remote logic set 221 with the local counter value. In some instances, the threshold value is the length of the training sequence.

As an example, if the training sequence takes 16 clocks, then the far deskew logic 302 can 1) store the counter value in storage logic 306 and 2) send the counter value via the communications interface 308 to the remote logic set 221 when a start of the training sequence is seen (i.e., a marker is received from the local deskew logic 310) while the counter value is between 0 and 16, inclusively.

Figure 4:
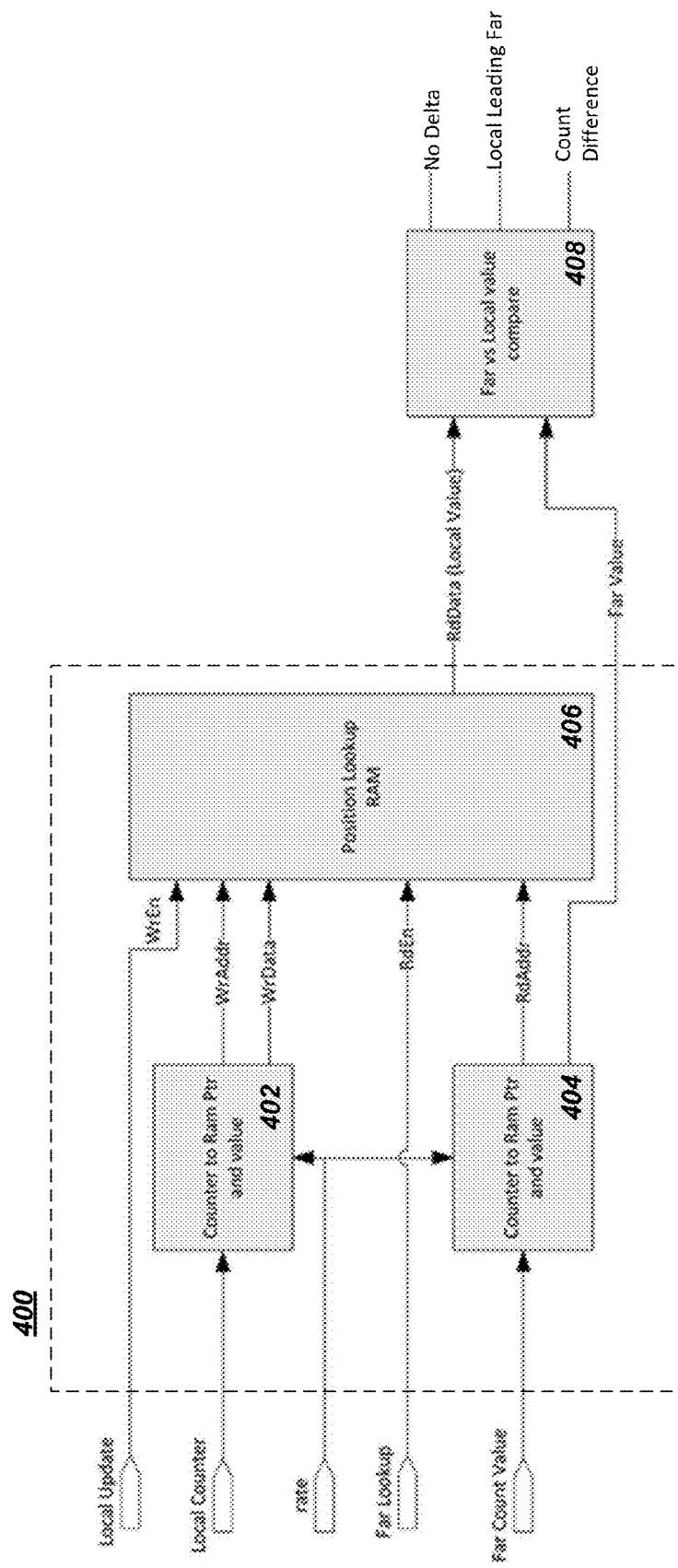
FIG. 4 is a schematic block diagram of a storage logic in accordance with embodiments of the present disclosure.

FIG. 4 is a schematic diagram of a storage logic 400 in accordance with embodiments of the present disclosure. The storage logic 400 is similar to storage logic 306 of FIG. 3 and storage logic 206 of FIG. 2. The storage logic 400 includes a Position Lookup Random Access Memory (RAM) 406 (also referenced to as position lookup 406). Position lookup 406 stores the counter value for the local logic set 201, and is write-enabled by a signal from the far deskew logic 302. For example, the far deskew logic 302 can send a local store signal that write-enables the position lookup 406 upon receiving a trigger event, such as receiving a marker and a counter value.

The storage logic 400 also includes a local counter operation logic 402. Local counter operation logic 402 splits the local counter value received from the far deskew logic 302 into an address portion and into a data portion. For example, local counter operation logic 402 performs a hashing of the local counter value to form an address portion of the local counter value and a data portion of the local counter value. The address portion of the local counter value can be a sufficient number of bits to act as a key or address in the position lookup 406. The address portion and the data portion of the local counter value are stored into the position lookup 406. For example, the upper four bits of the local counter value can act as the address portion or key for a hash table. The data portion can represent the position of the lane groups and can be stored as a value in a hash table. The address portion can point to the data portion in the hash table stored in the position lookup 406.

The storage logic 400 also includes a far counter operation logic 404 that splits the far counter value received from the remote logic set 221 into an address portion and a data portion. The address portion of the far counter value can be used to look up a matching local counter value address. If the far counter address and the local counter address match, then the far deskew logic 302 can read the local counter data and compare the local counter data with the far counter data.

Notably, the local counter operation logic 402 executes breaks the free running counter into two portions: an address portion and a data portion. For example, the local counter operation logic 402 executes a hashing function on the local counter value to establish an address portion of the local counter that defines an address in the position lookup RAM 406. The address portion acts as the "time window" and is used as the RAM's address. The data portion, which is from the lower bits of the counter value, acts like a marker period counter and is stored as data. Therefore, if it takes 16 cycles to send a TS and the free running counter is 8 bits, the upper 4 bits are used as the time window and the lower 4 as the time within the marker period. It should be noted that, in one embodiment, to avoid position aliasing, only half the marker period is considered valid in determining max skew (for 8 clocks in this example). Alternate embodiments may use more or less of the marker period without departing from the scope of this disclosure.

The comparator logic 408 can be part of the storage logic 400 or can be part of the far deskew logic 302, or can be a part of another logic (not shown).

As shown in FIG. 4, the comparator logic 408 uses local counter data as a first input and uses the far counter value as a second input. The comparator logic 408 compares the local counter data value with the far counter data value. If the local counter data value is smaller than the far counter data value (i.e., the local counter data value is considered earlier in time than the far counter data value), then the far deskew logic 302 can output a stall command (local leading far) to the local deskew logic 310. The local deskew logic 310 can stall the local lanes (e.g., local lane group 212) by a time amount equivalent to the difference between the local counter data value and the far counter data value (count difference). If there is no difference between the local counter data value and the far counter data value, then the lane groups 212 and 232 are considered to be deskewed and time synchronized, and therefore stalling (or further stalling) the lanes may not be needed.

In some embodiments, if the comparator logic 408 determines that the local counter data value is larger than the far counter data value (i.e., the local counter data value is considered later in time than the far counter data value), the comparator logic 408 may do nothing. But the same operations as described above are occurring at the remote logic set 221, which will determine that the remote lane group 232 should be stalled. In some embodiments, the far deskew logic 302 can send the count difference (or delta) to the remote logic set 221, which the remote logic set 221 can use to stall the remote lane group 232, if needed.

FIG. 5-A is a process flowchart for deskewing disparate lanes in accordance with embodiments of the present disclosure. Method 500 can be performed by processing logic that can comprise hardware (e.g., circuitry, dedicated logic, programmable logic, microcode, etc.), software (e.g., instructions run on a processing device), or a combination thereof. In one embodiment, method 500 is performed by a far deskewing logic, such as far deskewing logic 302 of FIG. 3.

At block 502, processing logic receives an indication that deskewing each lane of the lane group is completed, which ensures that all the lanes within the lane group are synchronized and are ready for transmission across a link, such as a PCIe link, etc. At block 504, processing logic receives a marker indicating that a local deskewing logic has seen all lanes of traffic within a lane group.

At block 506, processing logic receives a local counter value. When the marker is received and the local counter value is within a threshold value (e.g., within a length of the training sequence), processing logic stores the local counter value and transmits the local counter value to the remote logic set (block 508).

At block 510, the processing logic waits until it receives a far counter value. When the processing logic receives a far counter value, and the counter is expired (512), the processing logic can perform a comparison of the counter values to determine a time difference between the lane groups. The far counter value can be hashed into two components: a far counter address portion and a far counter data portion (514). The far counter address portion can be used to look up matching local counter address portions from the storage logic. When there is a match between the far counter address and the local counter address (516), the storage logic can output the local counter data portion into a comparator. The far counter data portion is also input into the comparator. The comparator compares the data portions only of the far counter value and the local counter value (518). If there is no match between the local counter address portion and the far counter address portion, then the processing logic can start over with the process at (506) by receiving a new counter value and clearing the storage logic. The lack of a match between the local counter address portion and the far counter address portion means that the difference in the position of the local lane group and the remote lane group is too large to perform the stall. The processing logic can wait until the processing logic receives counter values that are closer to each other in size so that it is the data portions that represent differences in time between the lane groups. The use of a portion of the counter value that represents the time difference (i.e., the data portion), increases the speed of the comparison between counter values while also reducing errors from cycle stalls.

The local counter value is hashed using a hashing function and stored as two parts: an address portion is stored and used for lookup purposes, and a data portion is stored and is used for comparison to the far counter data value. In some implementations, the hashing function is performed by a counter operation logic. The local counter operation logic sends the address portion and the data portion of the local counter value to the storage logic (e.g., in a hash table). The remote counter operation logic performs a hash on the remote counter value, and sends the address portion to the storage logic for lookup of a corresponding local address portion value. If there is a matching local address portion, the corresponding local data portion is sent a comparator logic. The remote counter operation logic sends a remote data portion directly to the comparator logic.

Turning now to FIG. 5-B, FIG. 5-B is a continuation of a process flow diagram 5-A for deskewing disparate lanes in accordance with embodiments of the present disclosure. The comparator logic for the local logic set determines whether the local counter data portion is less than the far counter data portion (520). If the local counter data portion is less than the far counter data portion, the local lanes are stalled (522) because the local lanes will be interpreted to be ahead-in-time of the far lanes. The comparator can output both a stall instruction and the counter difference value, which indicates the amount of time for the stall.

The comparator logic can determine whether the local counter data portion is greater than the far counter data portion (524). If the local counter data portion is greater than the far counter data portion, then the deskewing logic may not do anything because the deskewing will be done at the remote logic set (526). In some embodiments, the deskewing logic can send a signal, such as a counter delta or if the local counter data portion is equal to the far counter data portion, then deskewing is considered to be complete (528).

Figure 6:
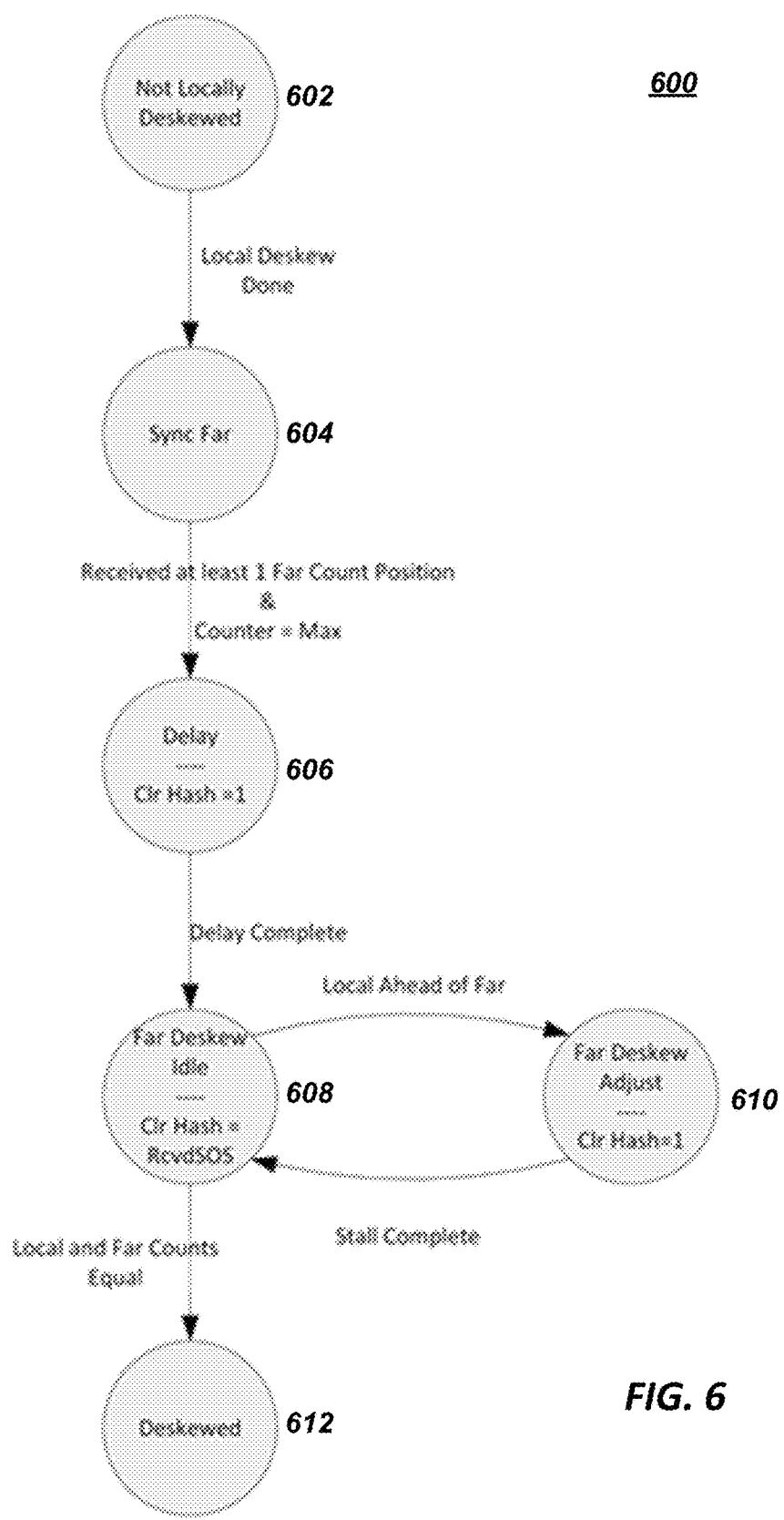
FIG. 6 is a state diagram illustrating logical states for deskewing disparate lane groups.

FIG. 6 is a state diagram 600 for deskewing between disparate lane groups, in accordance with embodiments of the present disclosure. The various states are performed by logic described above, including the local deskew logic, the far deskew logic, storage logic, comparator logic, and counter operation logic, among other logic.

1) The initial state Not_Locally_Deskewed 602 transitions to the next state (Sync_Far) when the local lane groups are deskewed.

2) In Sync_Far 604, anytime the local counter is between 0 and the length of a TS in clock cycles, and local marker is seen, a copy of the local counter value is sent to the remote logic set. For example, if a training sequence (TS) takes 16 clocks, then the local counter value is sent to a remote logic set when a start of TS is seen and the local counter value is between 0 and 16 inclusively. Sync_Far state 604 transitions to the next state when an update from the remote logic set has been received and the local counter reaches its max value.

3) The Delay state 606 is utilized to clear the position history stored in the RAM from previous cycles and to flush all in flight updates coming across the communication interface. This state ensures that current data from each of the local and remote logic sets are compared.

4) Far_Deskew_Idle 608 is where the far deskew logic parks until it gets a far counter value address portion that matches to a stored local counter value address portion. Once an update that matches is seen, the data portions from the local counter value and the far (remote) counter value are compared. If the local count value is considered earlier in time than the far count value, the Far_Deskew_Adjust 610 state is entered. (As an example, if the comparator determines that the data portion of the local counter value is less than the data portion of the far counter value, then the Far_Deskew_Adjust 610 state is entered. The counter difference or delta is determined in the Far_Deskew_Idle state.) If the local count value is considered later than the far counter value, this state is held. Should both count values be equal, deskew is complete and the Deskewed state is entered.

5) Far_Deskew_Adjust 610 is used to stall the local lanes by the calculated delta. Once this stall is complete, the control returns to the Far_Deskew_Idle state 608.

6) Deskewed state 612 is valid when the local and far (remote) counts are equal, and the lane groups are considered to be deskewed.

The following examples pertain to further embodiments.

One or more embodiments may provide an apparatus, a system, a machine readable storage, a machine readable medium, a method, and hardware- and/or software-based logic (e.g., implemented in connection with a shared memory controller) to deskew disparate lane groups.

In example 1, a method for deskewing disparate lane groups of data may include receiving a first counter value, the first counter value representing a position of a first stream of deskewed data, receiving a second counter value, the second counter value representing a position of a second stream of deskewed data, obtaining a data portion of the first counter value based on a lookup of an address portion of the first counter value using an address portion of the second counter value, comparing the data portion of the first counter value with a data portion of the second counter value, and stalling the first stream of deskewed data when the data portion of the first counter value is less than the data portion of the second counter value.

In example 2, the subject matter of example 1 may also include sending a counter value difference to the second stream of deskewed data when the data portion of the second counter value is less than the data portion of the first counter value, the counter value difference representing a difference between the data portion of the first counter value and the data portion of the second counter value and indicating that the second stream of deskewed data should be stalled.

In example 3, the subject matter of example 1 can also include signaling that the first stream of deskewed data and the second stream of deskewed data are time-aligned when the data portion of the first counter value is equal to the data portion of the second counter value.

In example 4, the subject matter of example 1 can also include identifying a delta between the data portion of the first counter value and the data portion of the second counter value, and stalling the first stream of deskewed data based on the delta.

In example 5, the subject matter of any of examples 1, 2, 3, or 4 can also include clearing a storage logic of the address portion of the first counter value and the data portion of the first counter value in response to stalling the first stream of deskewed data or sending the counter value difference to the second stream of deskewed data.

In example 6, a deskewing apparatus may include a first counter operation logic implemented at least in part on hardware to receive a first counter value representing a position of a first stream of deskewed data, and transmit an address portion of the first counter value and into a data portion of the first counter value. The deskewing apparatus may also include a second counter operation logic implemented at least on hardware to receive a second counter value representing a position of a second stream of deskewed data, and separate the second counter value into an address portion of the second counter value and into a data portion of the second counter value. The deskewing apparatus may also include a memory logic implemented at least on hardware to lookup the address portion of the first counter value based on the address portion of the second counter value. The deskewing apparatus may also include a comparator logic implemented at least in hardware to compare the data portion of the first counter value with the data portion of the second counter value, and output a count difference between the data portion of the first counter value and the data portion of the second counter value, the count difference representing a skew between the first stream of deskewed data and the second stream of deskewed data.

In example 7, the comparator logic of example 6 may also a) send a counter value difference to the second stream of deskewed data when the data portion of the second counter value is less than the data portion of the first counter value, the counter value difference indicating the second stream of deskewed data should be stalled; and/or b) signal that the first stream of deskewed data and the second stream of deskewed data are time-aligned when the data portion of the first counter value is equal to the data portion of the second counter value; and/or c) identify a delta between the data portion of the first counter value and the data portion of the second counter value, and stalling the first stream of deskewed data based on the delta.

In example 8, the comparator logic of any of examples 6 or 7 may also include logic implemented at least on hardware to separate the address portion of the first counter value from the data portion of the first counter value, and wherein the first counter operation logic comprising further logic implemented at least on hardware to separate the second counter value into an address portion of the second counter value and into a data portion of the second counter value. The data portion of the first counter value can be stored with the address portion of the first counter value, and the second counter value can be used to lookup the address portion of the first counter value to identify the data portion of the first counter value.

In example 9, an apparatus may include a data storage logic implemented at least in hardware to store an address portion of a first counter value and a data portion of a first counter value, the first counter value representing a skew of a first stream of data. The apparatus may also include a deskew control logic implemented at least in hardware to compare the data portion of the first counter value to a data portion of a second counter value, the second counter value representing a skew of a second stream of data, and stall one of the first stream of data or the second stream of data based on a comparison of the data portion of the first counter value to the data portion of the second counter value.

In example 10, the subject matter of example 9 may also include a local counter operator logic implemented at least in part in hardware to receive the first counter value and to output, to the data storage logic, the address portion of the first counter value and the data portion of the first counter value.

In example 11, the subject matter of any of examples 9 or 10 may also include a far counter operator logic implemented at least in part in hardware to receive the second counter value and to output, to the data storage logic, an address portion of the second counter value and to output, to a comparator logic, the data portion of the second counter value.

In example 12, the subject matter of any of examples 9, 10, or 11 may further include a comparator logic, implemented at least in part in hardware, to compare the data portion of the first counter value to the data portion of the second counter value, and to output a stall signal to the deskew control logic based on the comparison of the data portion of the first counter value to the data portion of the second counter value.

In example 13, the subject matter of any of examples 9, 10, 11, or 12 may also include a comparator logic to receive the data portion of the first counter value from the data storage logic and receives the data portion of the second counter value from the far counter operator logic.

In example 14, a system for deskewing disparate lane groups may include a data storage logic implemented at least in part in hardware to lookup an address portion of a first counter value based on an address portion of a second counter value, the first counter value representing a position in time of a first stream of data and the second counter value representing a position in time of a second stream of data, and output a data portion of the first counter value based on the lookup. The system may also include a deskew control logic implemented at least in part in hardware to compare the data portion of the first counter value to a data portion of a second counter value, and stall the first stream of data based on the comparison.

In example 15, the subject matter of example 14 may also include deskew control logic that stalls the first stream of data when the data portion of the first counter value is less than the data portion of the second counter value.

In example 16, the subject matter of any of examples 14 or 15 may include deskew control logic that stalls the first stream of data according to a count difference between the data portion of the first counter value and the data portion of the second counter value.

In example 17, the subject matter of any of examples 14, 15, or 16 may also include a counter implemented at least in part in hardware to output running counter value to the deskew control logic, the running counter values used to identify a position of the first stream of data.

In example 18, the subject matter of any of examples 14, 15, 16, or 17 may also include deskew control logic comprises further logic to identify the first counter value based on the received running counter values from the counter, and transmit the first counter value to the data storage logic upon reception of a marker representing the first stream of deskewed data and upon the expiration of the running counter values.

In example 19, the subject matter of any of examples 14, 15, 16, 17, or 18 may also include a first counter operator logic implemented at least in part in hardware to receive the first counter value from the deskew control logic, separate the address portion of the first counter value from the data portion of the first counter value, and transmit the address portion of the first counter value and the data portion of the first counter value to the data storage logic. The address portion of the first counter value may be used to lookup the data portion of the first counter value in the data storage logic.

In example 20, the subject matter of any of examples 14, 15, 16, 17, 18, or 19 may also include second counter operator logic implemented at least in part in hardware to receive the second counter value from the deskew control logic, separate the address portion of the second counter value from the data portion of the second counter value, wherein the address portion of the second counter value is used to lookup the address portion of the first counter value in the data storage logic, transmit the address portion of the second counter value to the data storage logic, and transmit the data portion of the second counter value to a comparator logic.

In example 21, the subject matter of any of examples 14, 15, 16, 17, 18, 19, or 20 may also include a comparator logic to compare the data portion of the first counter value to the data portion of the second counter value.

In example 22, the subject matter of any of examples 14, 15, 16, 17, 18, 19, 20, or 21 may also include comparator logic to output an indication to the deskew control logic that the first stream and the second stream are deskewed when the data portion of the first counter value and the data portion of the second counter value are equal.

In example 23, the subject matter of any of examples 14, 15, 16, 17, 18, 19, 20, 21, or 22 may also include comparator logic to output an indication to the deskew control logic that the first stream of data should be stalled when the data portion of the first counter value is smaller than the data portion of the second counter value, and output a count difference between the data portion of the first counter value and the data portion of the second counter value.

In example 24, a computer program product that is tangibly embodied on a non-transitory computer-readable medium includes instructions operable when executed to receive a first counter value, the first counter value representing a position of a first stream of deskewed data, receive a second counter value, the second counter value representing a position of a second stream of deskewed data, obtain a data portion of the first counter value based on a lookup of an address portion of the first counter value using an address portion of the second counter value, compare the data portion of the first counter value with a data portion of the second counter value, and stall the first stream of deskewed data when the data portion of the first counter value is less than the data portion of the second counter value.

In example 25, the subject matter of example 24 may also include sending a counter value difference to the second stream of deskewed data when the data portion of the second counter value is less than the data portion of the first counter value, the counter value difference representing a difference between the data portion of the first counter value and the data portion of the second counter value and indicating that the second stream of deskewed data should be stalled.

In example 26, the subject matter of example 24 can also include signaling that the first stream of deskewed data and the second stream of deskewed data are time-aligned when the data portion of the first counter value is equal to the data portion of the second counter value.

In example 27, the subject matter of example 24 can also include identifying a delta between the data portion of the first counter value and the data portion of the second counter value, and stalling the first stream of deskewed data based on the delta.

In example 28, the subject matter of any of examples 24, 25, 26, or 27 can also include clearing a storage logic of the address portion of the first counter value and the data portion of the first counter value in response to stalling the first stream of deskewed data or sending the counter value difference to the second stream of deskewed data.

In example 29, an apparatus for deskewing disparate lanes of data includes means for storing an address portion of a first counter value and a data portion of a first counter value, the first counter value representing a skew of a first stream of data; means for comparing the data portion of the first counter value to a data portion of a second counter value, the second counter value representing a skew of a second stream of data, and means for stalling one of the first stream of data or the second stream of data based on a comparison of the data portion of the first counter value to the data portion of the second counter value.

In example 30, the subject matter of example 29 may also include a means for receiving the first counter value and to output, to the data storage logic, the address portion of the first counter value and the data portion of the first counter value.

In example 31, the subject matter of examples 29 or 30 may also include a means for receiving the second counter value and to output, to the data storage logic, an address portion of the second counter value and to output, to a comparator logic, the data portion of the second counter value.

In example 32, the subject matter of any of examples 29, 30, or 31 may also include a means for comparing the data portion of the first counter value to the data portion of the second counter value, and means for outputting a stall signal to the deskew control logic based on the comparison of the data portion of the first counter value to the data portion of the second counter value.

In example 33, the subject matter of any of examples 29, 30, 31, or 32 may also include a means for receiving the data portion of the first counter value from the data storage logic and means for receiving the data portion of the second counter value from the far counter operator logic.

In example 34, a non-transient computer readable medium containing program instructions may cause a computer to receive a first counter value, the first counter value representing a position of a first stream of deskewed data; receive a second counter value, the second counter value representing a position of a second stream of deskewed data; obtain a data portion of the first counter value based on a lookup of an address portion of the first counter value using an address portion of the second counter value; compare the data portion of the first counter value with a data portion of the second counter value; and stall the first stream of deskewed data when the data portion of the first counter value is less than the data portion of the second counter value.

In example 35, the subject matter of example 34 may also include instructions operable when executed to send a counter value difference to the second stream of deskewed data when the data portion of the second counter value is less than the data portion of the first counter value, the counter value difference representing a difference between the data portion of the first counter value and the data portion of the second counter value and indicating that the second stream of deskewed data should be stalled.

In example 36, the subject matter of example 34 may also include instructions operable when executed to signal that the first stream of deskewed data and the second stream of deskewed data are time-aligned when the data portion of the first counter value is equal to the data portion of the second counter value.

In example 37, the subject matter of example 34 may also include instructions operable when executed to identify a delta between the data portion of the first counter value and the data portion of the second counter value, and stall the first stream of deskewed data based on the delta.

In example 38, the subject matter of any of examples 34, 35, 36, or 37 may also include clearing a storage logic of the address portion of the first counter value and the data portion of the first counter value in response to stalling the first stream of deskewed data or sending the counter value difference to the second stream of deskewed data In example 39, an apparatus may include means to perform a method as claimed in any the preceding examples.

In example 40, a machine-readable storage includes machine-readable instructions, that, when executed, can implement a method or realize an apparatus as claimed in any preceding example.

The preceding recitation of examples may be implemented individually or together with other examples.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 7:
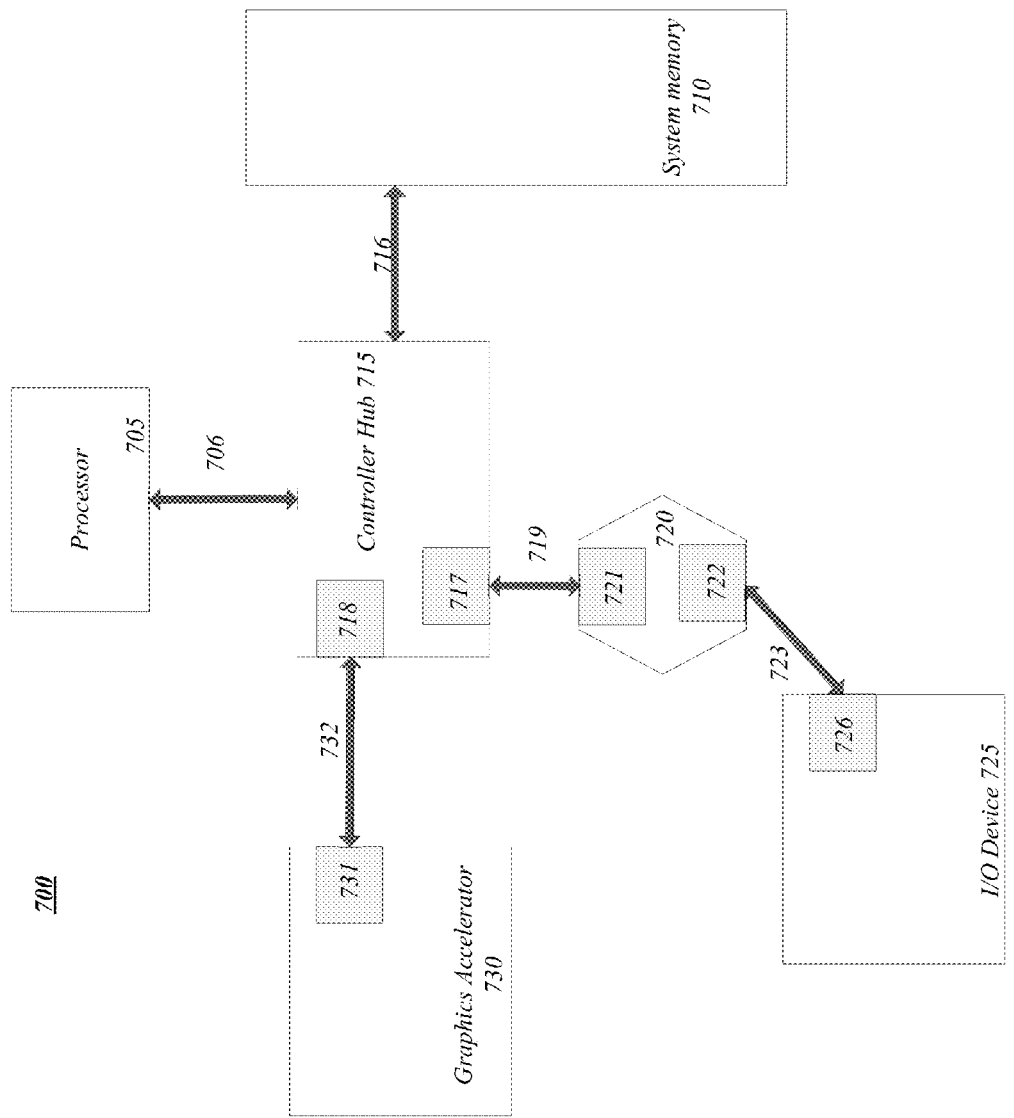
FIG. 7 illustrates an embodiment of a computing system including an interconnect architecture.

Referring to FIG. 7, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 8:
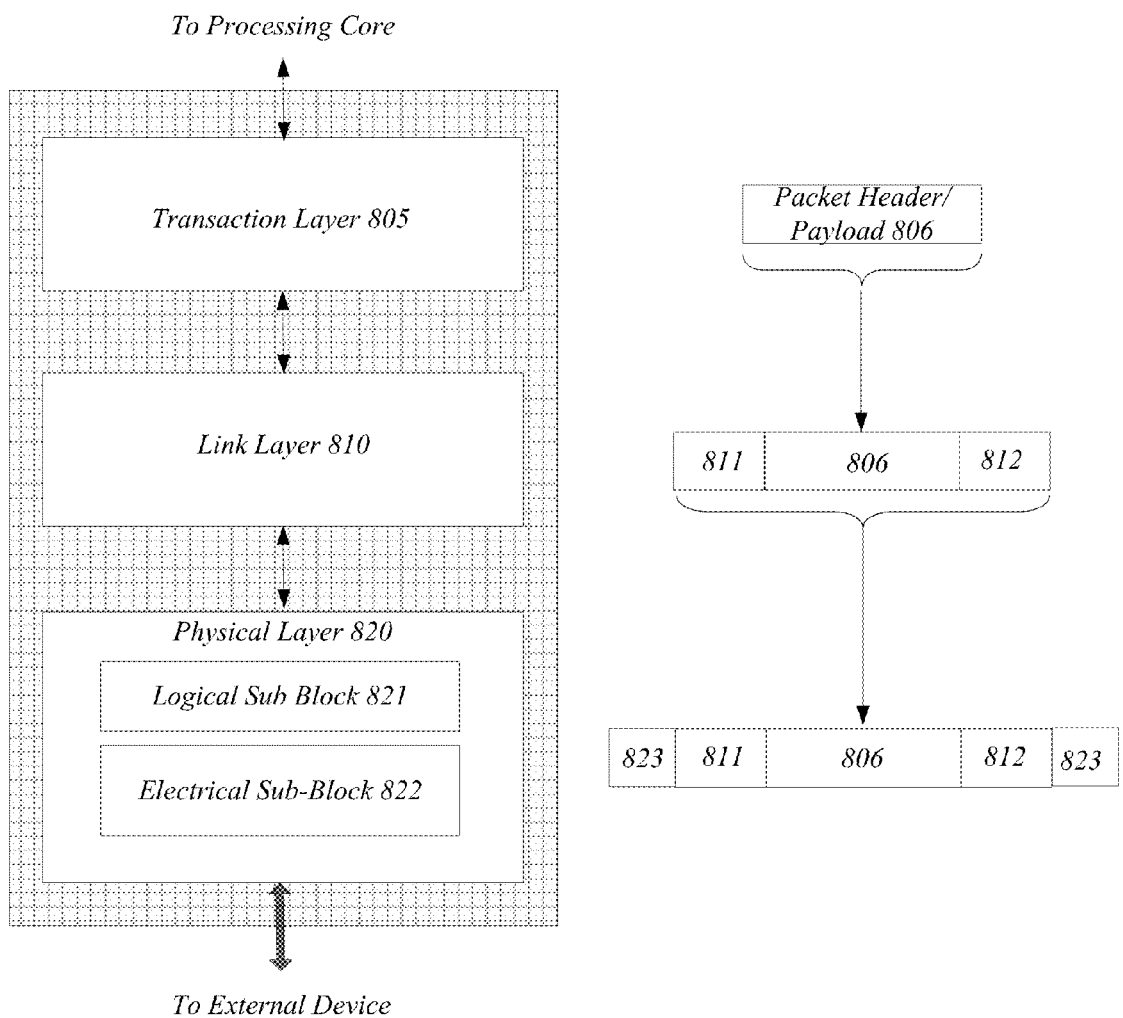
FIG. 8 illustrates an embodiment of a interconnect architecture including a layered stack.

Turning to FIG. 8 an embodiment of a layered protocol stack is illustrated. Layered protocol stack 800 includes any form of a layered communication stack, such as a Quick Path Interconnect (QPI) stack, a PCie stack, a next generation high performance computing interconnect stack, or other layered stack. Although the discussion immediately below in reference to FIGS. 7-10 are in relation to a PCIe stack, the same concepts may be applied to other interconnect stacks. In one embodiment, protocol stack 800 is a PCIe protocol stack including transaction layer 805, link layer 810, and physical layer 820. An interface, such as interfaces 717, 718, 721, 722, 726, and 731 in FIG. 1, may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 805 of the receiving device.

Transaction Layer

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The translation layer 805 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 805. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Figure 9:
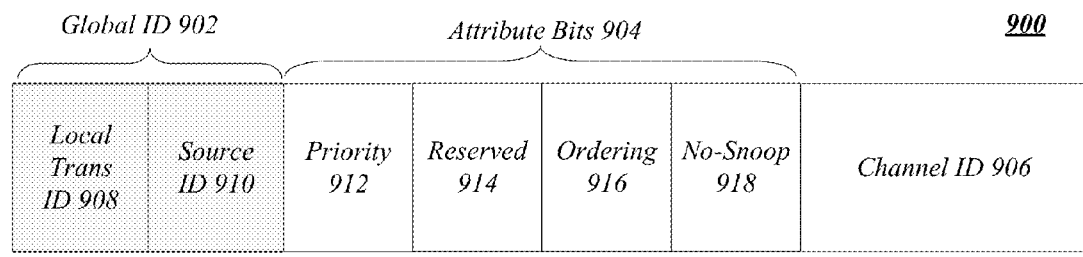
FIG. 9 illustrates an embodiment of a request or packet to be generated or received within an interconnect architecture.

Quickly referring to FIG. 9, an embodiment of a PCIe transaction descriptor is illustrated. In one embodiment, transaction descriptor 900 is a mechanism for carrying transaction information. In this regard, transaction descriptor 900 supports identification of transactions in a system. Other potential uses include tracking modifications of default transaction ordering and association of transaction with channels.

Transaction descriptor 900 includes global identifier field 902, attributes field 904 and channel identifier field 906. In the illustrated example, global identifier field 902 is depicted comprising local transaction identifier field 908 and source identifier field 910. In one embodiment, global transaction identifier 902 is unique for all outstanding requests.

According to one implementation, local transaction identifier field 908 is a field generated by a requesting agent, and it is unique for all outstanding requests that require a completion for that requesting agent. Furthermore, in this example, source identifier 910 uniquely identifies the requestor agent within a PCIe hierarchy. Accordingly, together with source ID 910, local transaction identifier 908 field provides global identification of a transaction within a hierarchy domain.

Attributes field 904 specifies characteristics and relationships of the transaction. In this regard, attributes field 904 is potentially used to provide additional information that allows modification of the default handling of transactions. In one embodiment, attributes field 904 includes priority field 912, reserved field 914, ordering field 916, and no-snoop field 918. Here, priority sub-field 912 may be modified by an initiator to assign a priority to the transaction. Reserved attribute field 914 is left reserved for future, or vendor-defined usage. Possible usage models using priority or security attributes may be implemented using the reserved attribute field.

In this example, ordering attribute field 916 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 918 is utilized to determine if transactions are snooped. As shown, channel ID Field 906 identifies a channel that a transaction is associated with.

Link Layer

Link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, i.e. an identification number or packet number, calculates and applies an error detection code, i.e. CRC 812, and submits the modified TLPs to the Physical Layer 820 for transmission across a physical to an external device.

Physical Layer

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is de-serialized and supplied to logical sub-block 821. In one embodiment, an 8b/10b transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 10:
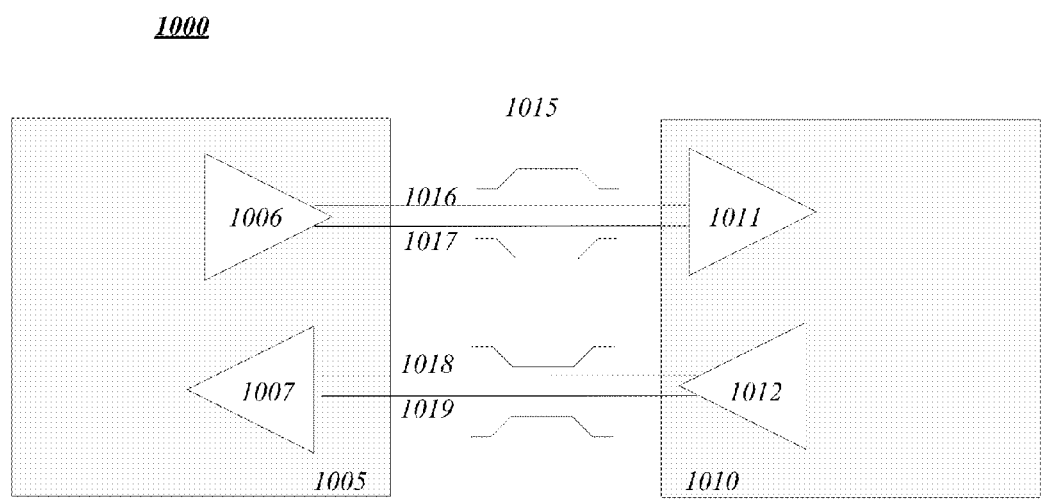
FIG. 10 illustrates an embodiment of a transmitter and receiver pair for an interconnect architecture.

Referring next to FIG. 10, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, i.e. paths 1016 and 1017, and two receiving paths, i.e. paths 1018 and 1019, are included in a PCIe link.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 415. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 11:
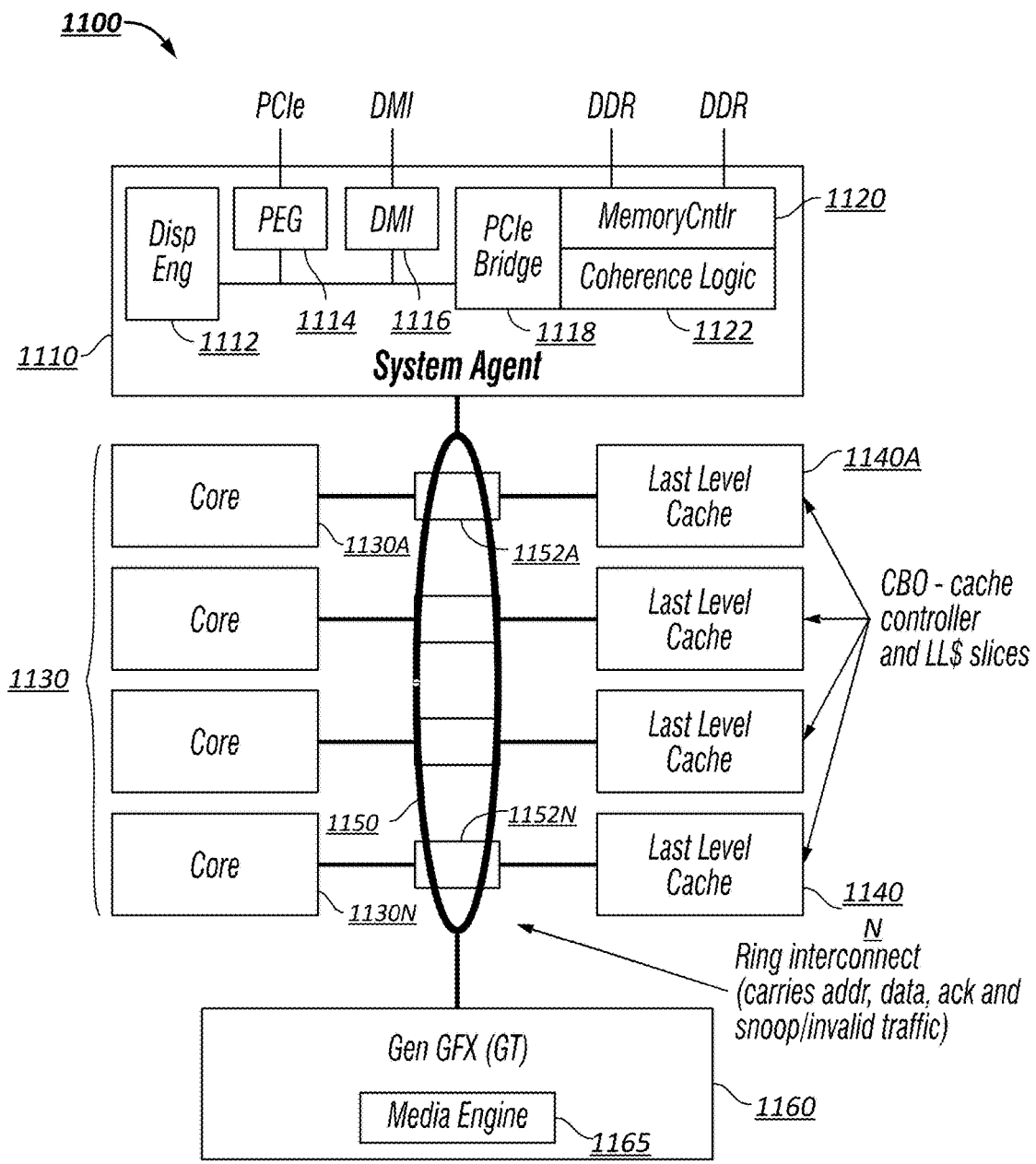
FIG. 11 illustrates an embodiment of a block diagram for a computing system.

Referring now to FIG. 11, shown is a block diagram of an embodiment of a multicore processor. As shown in the embodiment of FIG. 11, processor 1100 includes multiple domains. Specifically, a core domain 1130 includes a plurality of cores 1130A-1130N, a graphics domain 1160 includes one or more graphics engines having a media engine 1165, and a system agent domain 1110.

In various embodiments, system agent domain 1110 handles power control events and power management, such that individual units of domains 1130 and 1160 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1130 and 1160 may operate at different voltage and/or power, and furthermore the individual units within the domains each potentially operate at an independent frequency and voltage. Note that while only shown with three domains, understand the scope of the present invention is not limited in this regard and additional domains may be present in other embodiments.

As shown, each core 1130 further includes low level caches in addition to various execution units and additional processing elements. Here, the various cores are coupled to each other and to a shared cache memory that is formed of a plurality of units or slices of a last level cache (LLC) 1140A-1140N; these LLCs often include storage and cache controller functionality and are shared amongst the cores, as well as potentially among the graphics engine too.

As seen, a ring interconnect 1150 couples the cores together, and provides interconnection between the core domain 1130, graphics domain 1160 and system agent circuitry 1110, via a plurality of ring stops 1152A-1152N, each at a coupling between a core and LLC slice. As seen in FIG. 11, interconnect 1150 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 1110 includes display engine 1112 which is to provide control of and an interface to an associated display. System agent domain 1110 may include other units, such as: an integrated memory controller 1120 that provides for an interface to a system memory (e.g., a DRAM implemented with multiple DIMMs; coherence logic 1122 to perform memory coherence operations. Multiple interfaces may be present to enable interconnection between the processor and other circuitry. For example, in one embodiment at least one direct media interface (DMI) 1116 interface is provided as well as one or more PCIe™ interfaces 1114. The display engine and these interfaces typically couple to memory via a PCIe™ bridge 1118. Still further, to provide for communications between other agents, such as additional processors or other circuitry, one or more other interfaces (e.g. an Intel® Quick Path Interconnect (QPI) fabric) may be provided.

Figure 12:
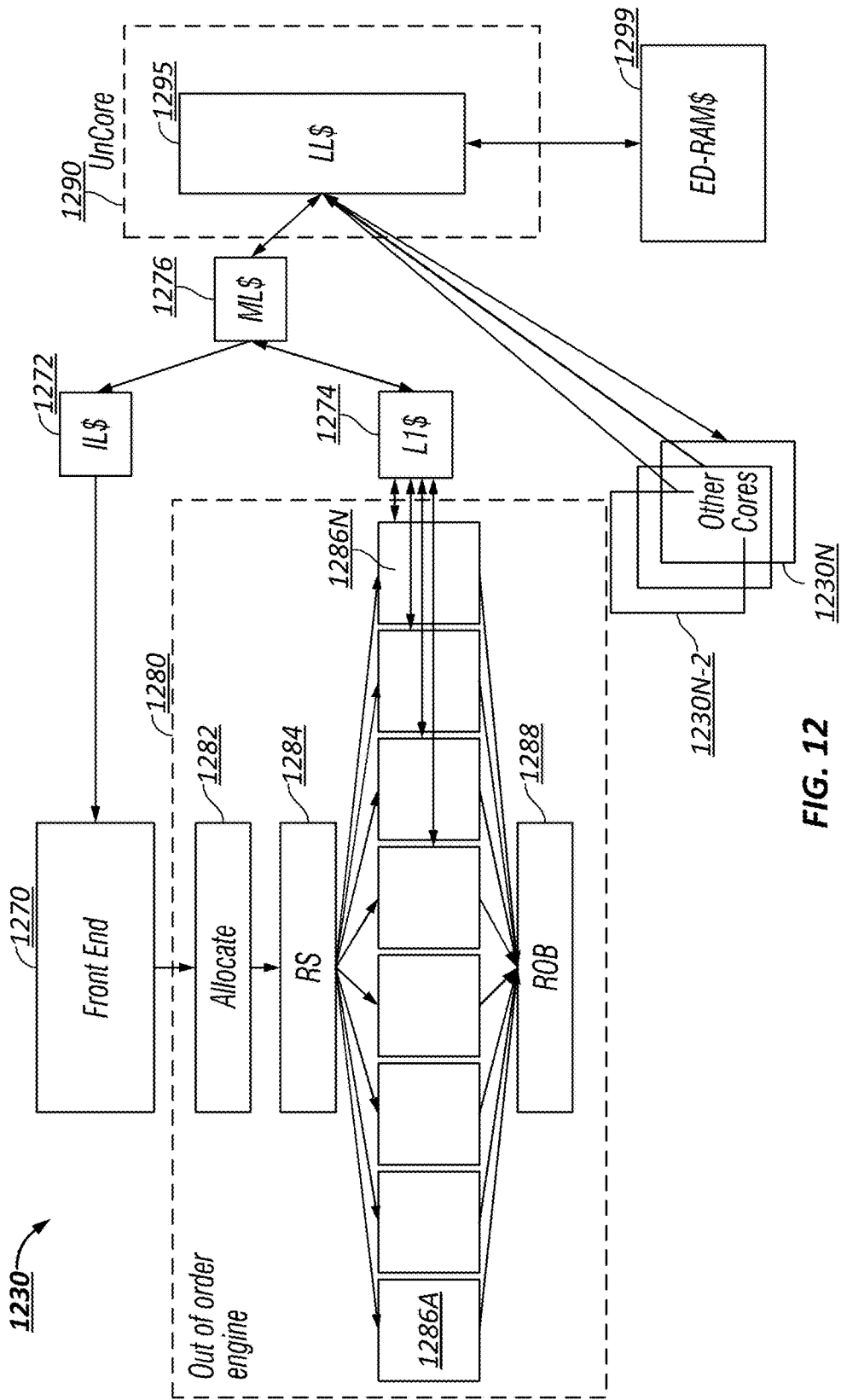
FIG. 12 illustrates an embodiment of a block diagram for a processor.

Referring now to FIG. 12, shown is a block diagram of a representative core; specifically, logical blocks of a back-end of a core, such as core 1130 from FIG. 11. In general, the structure shown in FIG. 12 includes an out-of-order processor that has a front end unit 1270 used to fetch incoming instructions, perform various processing (e.g. caching, decoding, branch predicting, etc.) and passing instructions/operations along to an out-of-order (OOO) engine 1280. OOO engine 1280 performs further processing on decoded instructions.

Specifically in the embodiment of FIG. 12, out-of-order engine 1280 includes an allocate unit 1282 to receive decoded instructions, which may be in the form of one or more micro-instructions or uops, from front end unit 1270, and allocate them to appropriate resources such as registers and so forth. Next, the instructions are provided to a reservation station 1284, which reserves resources and schedules them for execution on one of a plurality of execution units 1286A-1286N. Various types of execution units may be present, including, for example, arithmetic logic units (ALUs), load and store units, vector processing units (VPUs), floating point execution units, among others. Results from these different execution units are provided to a reorder buffer (ROB) 1288, which take unordered results and return them to correct program order.

Still referring to FIG. 12, note that both front end unit 1270 and out-of-order engine 1280 are coupled to different levels of a memory hierarchy. Specifically shown is an instruction level cache 1272, that in turn couples to a mid-level cache 1276, that in turn couples to a last level cache 1295. In one embodiment, last level cache 1295 is implemented in an on-chip (sometimes referred to as uncore) unit 1290. As an example, unit 1290 is similar to system agent 1110 of FIG. 11. As discussed above, UnCore 1290 communicates with system memory 1299, which, in the illustrated embodiment, is implemented via ED RAM. Note also that the various execution units 1286 within out-of-order engine 1280 are in communication with a first level cache 1274 that also is in communication with mid-level cache 1276. Note also that additional cores 1230N-2-1230N can couple to LLC 1295. Although shown at this high level in the embodiment of FIG. 12, understand that various alterations and additional components may be present.

Figure 13:
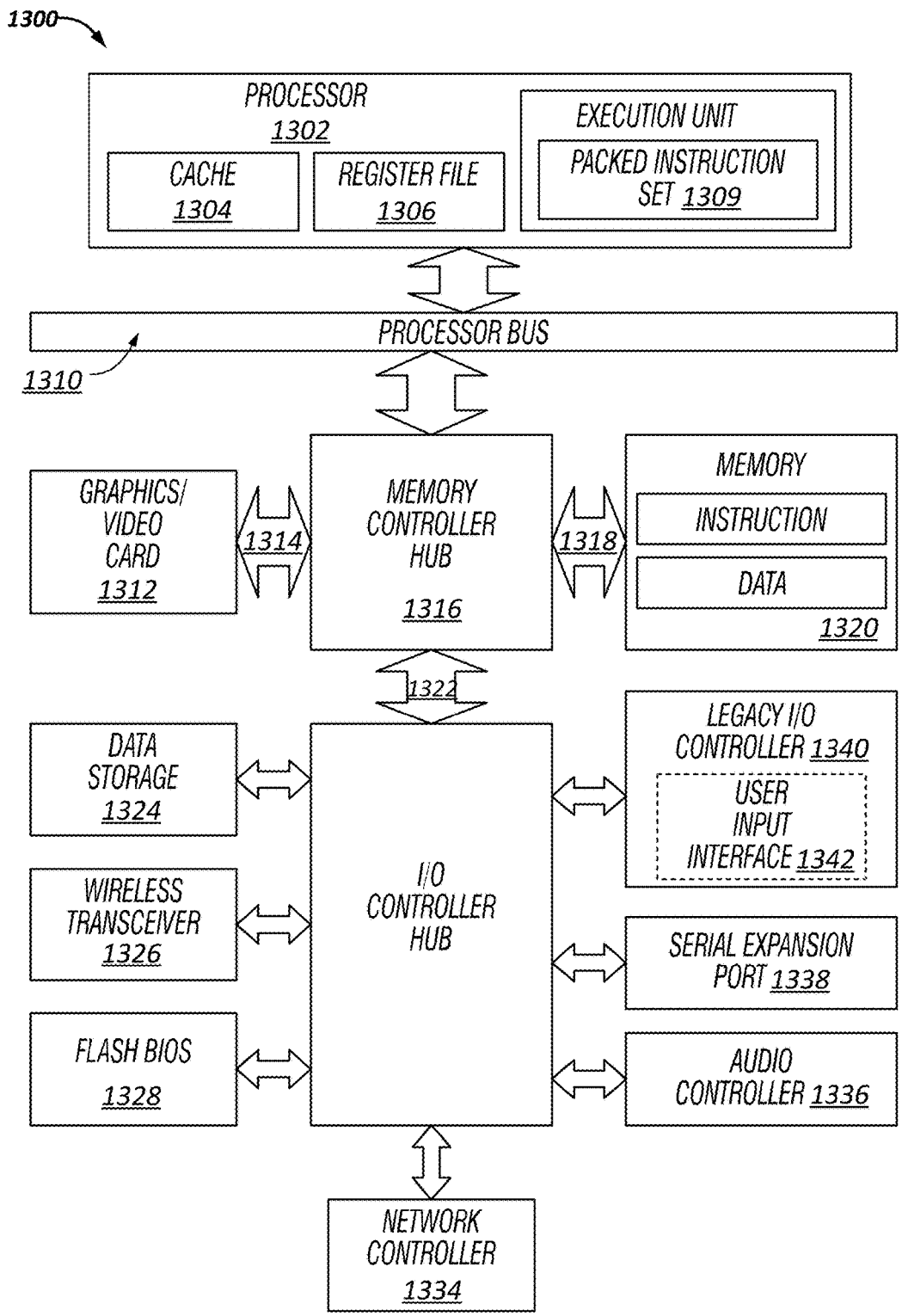
FIG. 13 illustrates another embodiment of a block diagram for a computing system including a processor.

Turning to FIG. 13, a block diagram of an exemplary computer system formed with a processor that includes execution units to execute an instruction, where one or more of the interconnects implement one or more features in accordance with one embodiment of the present invention is illustrated. System 1300 includes a component, such as a processor 1302 to employ execution units including logic to perform algorithms for process data, in accordance with the present invention, such as in the embodiment described herein. System 1300 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1300 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1302 includes one or more execution units 1308 to implement an algorithm that is to perform at least one instruction. One embodiment may be described in the context of a single processor desktop or server system, but alternative embodiments may be included in a multiprocessor system. System 1300 is an example of a 'hub' system architecture. The computer system 1300 includes a processor 1302 to process data signals. The processor 1302, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1302 is coupled to a processor bus 1310 that transmits data signals between the processor 1302 and other components in the system 1300. The elements of system 1300 (e.g. graphics accelerator 1312, memory controller hub 1316, memory 1320, I/O controller hub 1324, wireless transceiver 1326, Flash BIOS 1328, Network controller 1334, Audio controller 1336, Serial expansion port 1338, I/O controller 1340, etc.) perform their conventional functions that are well known to those familiar with the art.

In one embodiment, the processor 1302 includes a Level 1 (L1) internal cache memory 1304. Depending on the architecture, the processor 1302 may have a single internal cache or multiple levels of internal caches. Other embodiments include a combination of both internal and external caches depending on the particular implementation and needs. Register file 1306 is to store different types of data in various registers including integer registers, floating point registers, vector registers, banked registers, shadow registers, checkpoint registers, status registers, and instruction pointer register.

Execution unit 1308, including logic to perform integer and floating point operations, also resides in the processor 1302. The processor 1302, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1302. For one embodiment, execution unit 1308 includes logic to handle a packed instruction set 1309. By including the packed instruction set 1309 in the instruction set of a general-purpose processor 1302, along with associated circuitry to execute the instructions, the operations used by many multimedia applications may be performed using packed data in a general-purpose processor 1302. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1308 may also be used in micro controllers, embedded processors, graphics devices, DSPs, and other types of logic circuits. System 1300 includes a memory 1320. Memory 1320 includes a dynamic random access memory (DRAM) device, a static random access memory (SRAM) device, flash memory device, or other memory device. Memory 1320 stores instructions and/or data represented by data signals that are to be executed by the processor 1302.

Note that any of the aforementioned features or aspects of the invention may be utilized on one or more interconnect illustrated in FIG. 13. For example, an on-die interconnect (ODI), which is not shown, for coupling internal units of processor 1302 implements one or more aspects of the invention described above. Or the invention is associated with a processor bus 1310 (e.g. Intel Quick Path Interconnect (QPI) or other known high performance computing interconnect), a high bandwidth memory path 1318 to memory 1320, a point-to-point link to graphics accelerator 1312 (e.g. a Peripheral Component Interconnect express (PCIe) compliant fabric), a controller hub interconnect 1322, an I/O or other interconnect (e.g. USB, PCI, PCIe) for coupling the other illustrated components. Some examples of such components include the audio controller 1336, firmware hub (flash BIOS) 1328, wireless transceiver 1326, data storage 1324, legacy I/O controller 1310 containing user input and keyboard interfaces 1342, a serial expansion port 1338 such as Universal Serial Bus (USB), and a network controller 1334. The data storage device 1324 can comprise a hard disk drive, a floppy disk drive, a CD-ROM device, a flash memory device, or other mass storage device.

Figure 14:
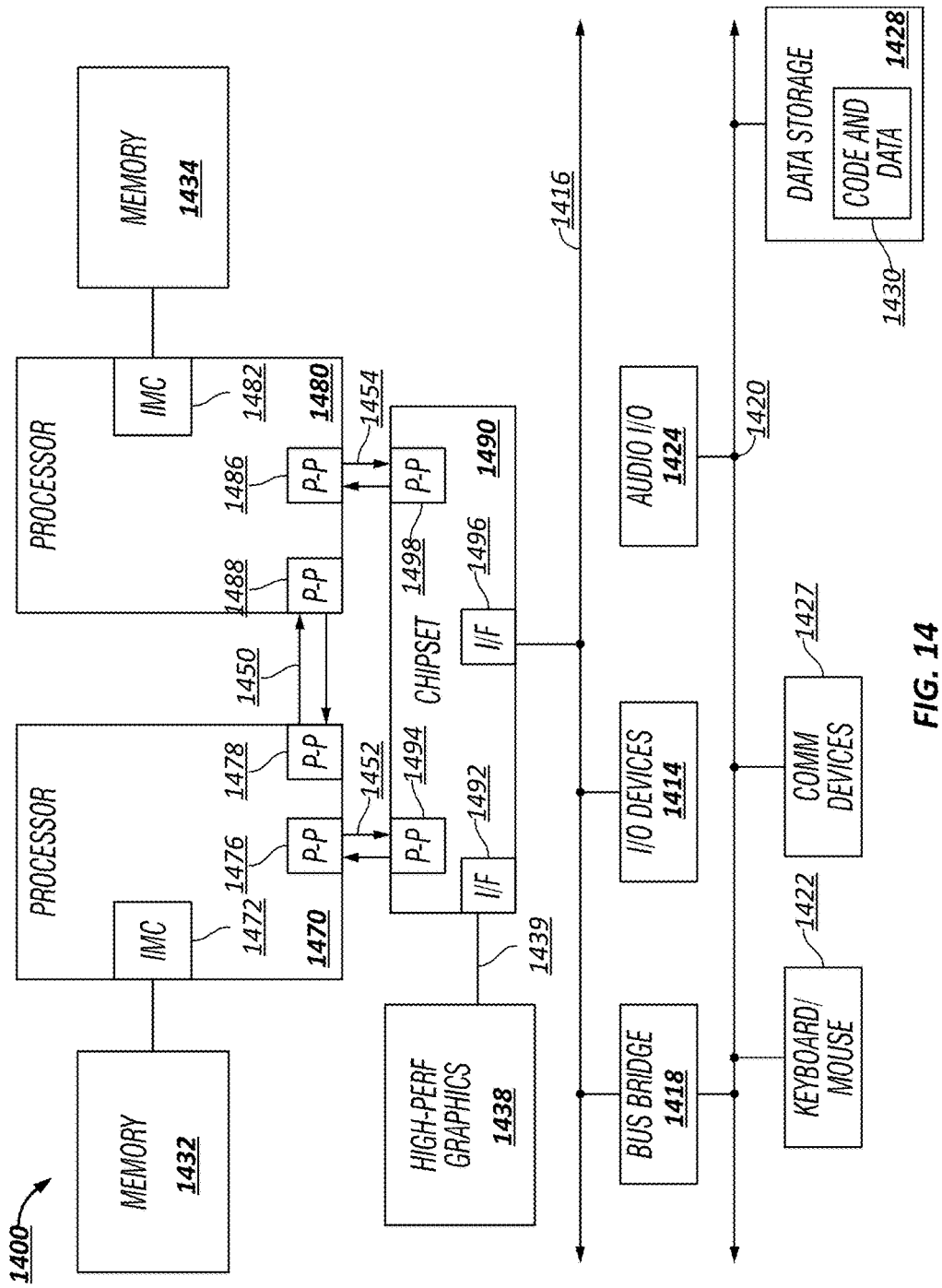
FIG. 14 illustrates an embodiment of a block for a computing system including multiple processor sockets.

Referring now to FIG. 14, shown is a block diagram of a second system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as Intel's Quick Path Interconnect (QPI) architecture. As a result, the invention may be implemented within the QPI architecture.

While shown with only two processors 1470, 1480, it is to be understood that the scope of the present invention is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

FIG. 15.

Figure 15:
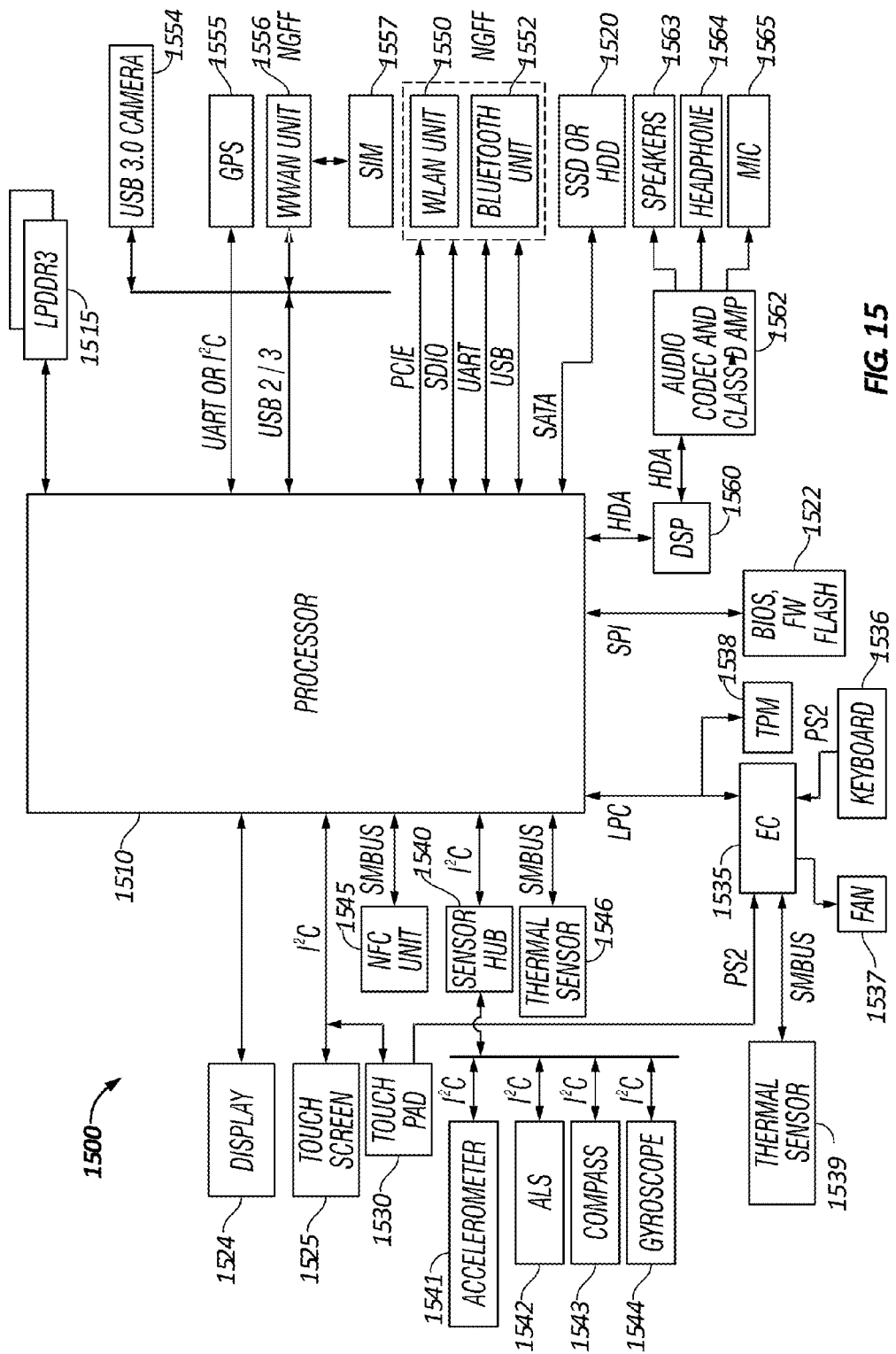
FIG. 15 illustrates another embodiment of a block diagram for a computing system.

Referring now to FIG. 15, a block diagram of components present in a computer system in accordance with an embodiment of the present invention is illustrated. As shown in FIG. 15, system 1500 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 15 is intended to show a high level view of many components of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

As seen in FIG. 15, a processor 1510, in one embodiment, includes a microprocessor, multi-core processor, multi-threaded processor, an ultra low voltage processor, an embedded processor, or other known processing element. In the illustrated implementation, processor 1510 acts as a main processing unit and central hub for communication with many of the various components of the system 1500. As one example, processor 1500 is implemented as a system on a chip (SoC). As a specific illustrative example, processor 1510 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1510 in one implementation will be discussed further below to provide an illustrative example.

Processor 1510, in one embodiment, communicates with a system memory 1515. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (13P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1520 may also couple to processor 1510. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 15, a flash device 1522 may be coupled to processor 1510, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1500. Specifically shown in the embodiment of FIG. 15 is a display 1524 which may be a high definition LCD or LED panel configured within a lid portion of the chassis. This display panel may also provide for a touch screen 1525, e.g., adapted externally over the display panel such that via a user's interaction with this touch screen, user inputs can be provided to the system to enable desired operations, e.g., with regard to the display of information, accessing of information and so forth. In one embodiment, display 1524 may be coupled to processor 1510 via a display interconnect that can be implemented as a high performance graphics interconnect. Touch screen 1525 may be coupled to processor 1510 via another interconnect, which in an embodiment can be an I$^2$C interconnect. As further shown in FIG. 15, in addition to touch screen 1525, user input by way of touch can also occur via a touch pad 1530 which may be configured within the chassis and may also be coupled to the same I$^2$C interconnect as touch screen 1525.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1510 in different manners. Certain inertial and environmental sensors may couple to processor 1510 through a sensor hub 1540, e.g., via an I$^2$C interconnect. In the embodiment shown in FIG. 15, these sensors may include an accelerometer 1541, an ambient light sensor (ALS) 1542, a compass 1543 and a gyroscope 1544. Other environmental sensors may include one or more thermal sensors 1546 which in some embodiments couple to processor 1510 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off In such a platform, power management can be made to be transparent to applications and maintain constant connectivity, in part due to offload technology to enable the lowest powered component to perform an operation.

Also seen in FIG. 15, various peripheral devices may couple to processor 1510 via a low pin count (LPC) interconnect. In the embodiment shown, various components can be coupled through an embedded controller 1535. Such components can include a keyboard 1536 (e.g., coupled via a PS2 interface), a fan 1537, and a thermal sensor 1539. In some embodiments, touch pad 1530 may also couple to EC 1535 via a PS2 interface. In addition, a security processor such as a trusted platform module (TPM) 1538 in accordance with the Trusted Computing Group (TCG) TPM Specification Version 1.2, dated Oct. 2, 2003, may also couple to processor 1510 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt' ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1500 can communicate with external devices in a variety of manners, including wirelessly. In the embodiment shown in FIG. 15, various wireless modules, each of which can correspond to a radio configured for a particular wireless communication protocol, are present. One manner for wireless communication in a short range such as a near field may be via a near field communication (NFC) unit 1545 which may communicate, in one embodiment with processor 1510 via an SMBus. Note that via this NFC unit 1545, devices in close proximity to each other can communicate. For example, a user can enable system 1500 to communicate with another (e.g.) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 15, additional wireless units can include other short range wireless engines including a WLAN unit 1550 and a Bluetooth unit 1552. Using WLAN unit 1550, Wi-Fi™ communications in accordance with a given Institute of Electrical and Electronics Engineers (IEEE) 802.11 standard can be realized, while via Bluetooth unit 1552, short range communications via a Bluetooth protocol can occur. These units may communicate with processor 1510 via, e.g., a USB link or a universal asynchronous receiver transmitter (UART) link. Or these units may couple to processor 1510 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1556 which in turn may couple to a subscriber identity module (SIM) 1557. In addition, to enable receipt and use of location information, a GPS module 1555 may also be present. Note that in the embodiment shown in FIG. 15, WWAN unit 1556 and an integrated capture device such as a camera module 1554 may communicate via a given USB protocol such as a USB 2.0 or 3.0 link, or a UART or I$^2$C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1560, which may couple to processor 1510 via a high definition audio (HDA) link. Similarly, DSP 1560 may communicate with an integrated coder/decoder (CODEC) and amplifier 1562 that in turn may couple to output speakers 1563 which may be implemented within the chassis. Similarly, amplifier and CODEC 1562 can be coupled to receive audio inputs from a microphone 1565 which in an embodiment can be implemented via dual array microphones (such as a digital microphone array) to provide for high quality audio inputs to enable voice-activated control of various operations within the system. Note also that audio outputs can be provided from amplifier/CODEC 1562 to a headphone jack 1564. Although shown with these particular components in the embodiment of FIG. 15, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1510 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1535. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1535 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 15, understand the scope of the present invention is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.) 40-44Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 16:
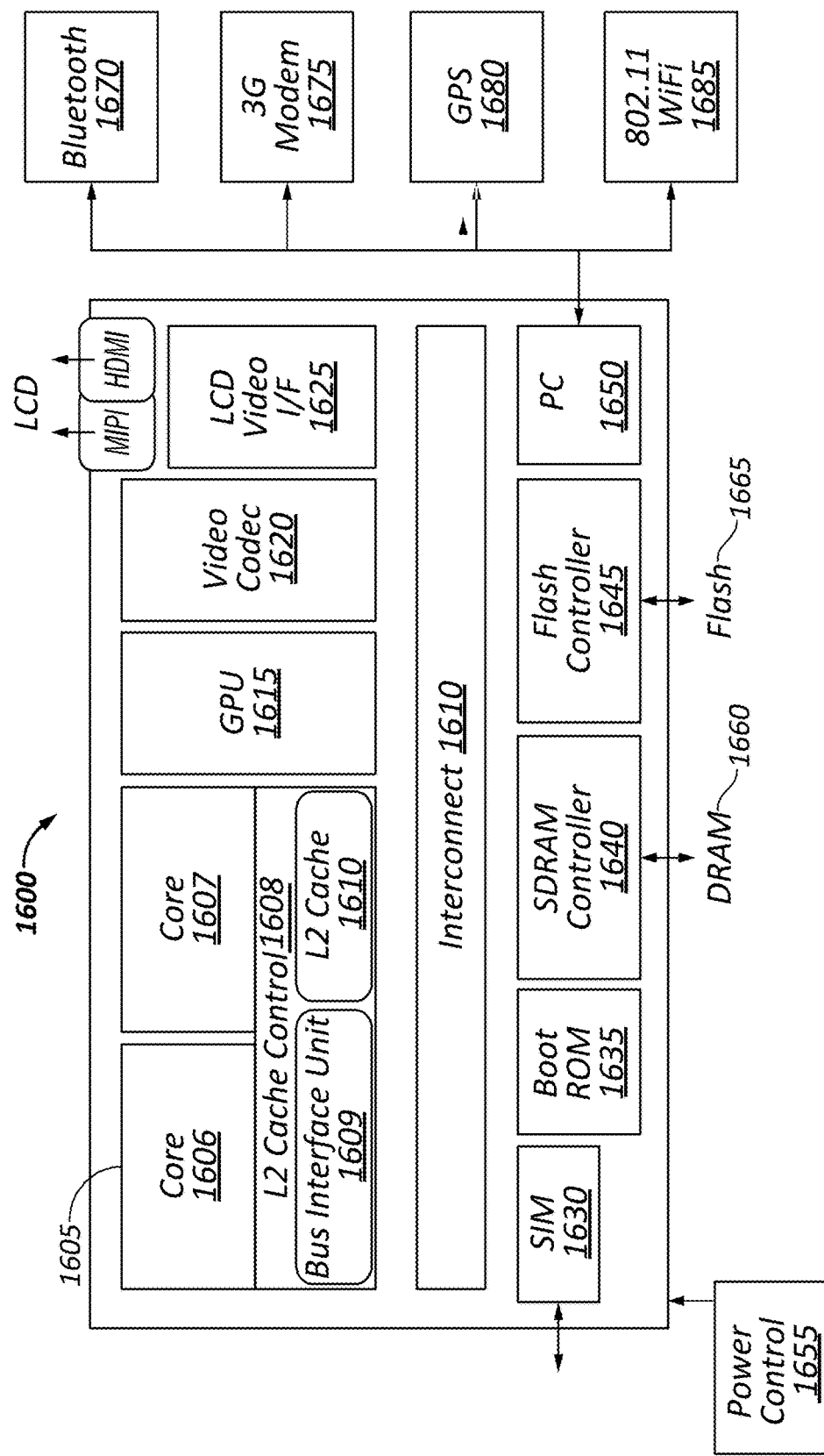
FIG. 16 illustrates another embodiment of a block diagram for a computing system.

Turning next to FIG. 16, an embodiment of a system on-chip (SOC) design in accordance with the inventions is depicted. As a specific illustrative example, SOC 1600 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1600 includes 2 cores—1606 and 1607. Similar to the discussion above, cores 1606 and 1607 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1606 and 1607 are coupled to cache control 1608 that is associated with bus interface unit 1609 and L2 cache 1610 to communicate with other parts of system 1600. Interconnect 1610 includes an on-chip interconnect, such as an IOSF, AMBA, or other interconnect discussed above, which potentially implements one or more aspects of the described invention.

Interface 1610 provides communication channels to the other components, such as a Subscriber Identity Module (SIM) 1630 to interface with a SIM card, a boot rom 1635 to hold boot code for execution by cores 1606 and 1607 to initialize and boot SOC 1600, a SDRAM controller 1640 to interface with external memory (e.g. DRAM 1660), a flash controller 1645 to interface with non-volatile memory (e.g. Flash 1665), a peripheral control 1250 (e.g. Serial Peripheral Interface) to interface with peripherals, video codecs 1620 and Video interface 1625 to display and receive input (e.g. touch enabled input), GPU 1615 to perform graphics related computations, etc. Any of these interfaces may incorporate aspects of the invention described herein.

In addition, the system illustrates peripherals for communication, such as a Bluetooth module 1670, 3G modem 1675, GPS 1685, and WiFi 1685. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
    receiving, from a local counter, a first counter value, the first counter value representing a position of a first stream of deskewed data on a first multi-lane link compliant with a peripheral component interface express (PCIe) protocol;
    receiving, from a communications interface associated with a second stream of deskewed data, a second counter value, the second counter value representing a position of the second stream of deskewed data on a second multi-lane link compliant with a peripheral component interface express (PCIe) protocol;
    obtaining a data portion of the first counter value based on a lookup of an address portion of the first counter value using an address portion of the second counter value;
    comparing the data portion of the first counter value with a data portion of the second counter value; and
    stalling the first stream of deskewed data from transmission on a multi-lane PCIe link when the data portion of the first counter value is less than the data portion of the second counter value.

2. The method of claim 1, further comprising sending a counter value difference to the second stream of deskewed data when the data portion of the second counter value is less than the data portion of the first counter value, the counter value difference representing a difference between the data portion of the first counter value and the data portion of the second counter value and indicating that the second stream of deskewed data should be stalled.

3. The method of claim 1, further comprising clearing a storage logic of the address portion of the first counter value and the data portion of the first counter value in response to stalling the first stream of deskewed data.

4. The method of claim 1, further comprising signaling that the first stream of deskewed data and the second stream of deskewed data are time-aligned when the data portion of the first counter value is equal to the data portion of the second counter value.

5. The method of claim 1, further comprising identifying a delta between the data portion of the first counter value and the data portion of the second counter value, and stalling the first stream of deskewed data based on the delta.

6. A deskew apparatus comprising:
a first counter operation logic implemented at least in part on hardware to:
receive, from a local counter, a first counter value representing a position of a first stream of deskewed data on a first multi-lane link compliant with a peripheral component interface express (PCIe) protocol (multi-lane PCIe link), and
a second counter operation logic implemented at least on hardware to:
receive, from a communications interface associated with a second stream of deskewed data, a second counter value representing a position of a second stream of deskewed data on a second multi-lane PCIe link, and
memory logic implemented at least on hardware to:
lookup an address portion of the first counter value from a random access memory based on an address portion of the second counter value; and
a comparator logic implemented at least in hardware to:
compare a data portion of the first counter value with a data portion of the second counter value, and
output a count difference between the data portion of the first counter value and the data portion of the second counter value, the count difference representing a skew between the first stream of deskewed data and the second stream of deskewed data.

7. The apparatus of claim 6, comprising further comparator logic to send a counter value difference to the second stream of deskewed data when the data portion of the second counter value is less than the data portion of the first counter value, the counter value difference indicating the second stream of deskewed data should be stalled from transmission on the second multi-lane PCIe link.

8. The apparatus of claim 6, the first counter operation logic comprising further logic implemented at least in part on hardware to:
separate the address portion of the first counter value from the data portion of the first counter value; and
wherein the first counter operation logic comprising further logic implemented at least in part on hardware to:
separate the second counter value into an address portion of the second counter value and into a data portion of the second counter value,
wherein the data portion of the first counter value is stored with the address portion of the first counter value, and
wherein the second counter value is used to lookup the address portion of the first counter value to identify the data portion of the first counter value.

9. The apparatus of claim 6, comprising further comparator logic to signal that the first stream of deskewed data and the second stream of deskewed data are time-aligned when the data portion of the first counter value is equal to the data portion of the second counter value.

10. The apparatus of claim 6, comprising further comparator logic to identify a delta between the data portion of the first counter value and the data portion of the second counter value, and stall the first stream of deskewed data based on the delta.

11. An apparatus comprising:
a deskew control logic implemented at least in part in hardware to:
compare a data portion of a first counter value to a data portion of a second counter value, the first counter value representing a skew of a first stream of data on a first multi-lane link compliant with a peripheral component interface express (PCIe) protocol (PCIe link) and the second counter value representing a skew of a second stream of data on a second multi-lane PCIe link, and
stall one of the first stream of data from transmission on the first multi-lane PCIe link or the second stream of data from transmission on the second multi-lane PCIe link based on a comparison of the data portion of the first counter value to the data portion of the second counter value;
the apparatus further comprising:
a data storage logic implemented at least in hardware to:
store an address portion of the first counter value and the data portion of the first counter value; and
a local counter operator logic implemented at least in part in hardware to receive the first counter value and to output, to the data storage logic, the address portion of the first counter value and the data portion of the first counter value.

12. The apparatus of claim 11, further comprising a far counter operator logic implemented at least in part in hardware to receive the second counter value and to output, to the data storage logic, an address portion of the second counter value and to output, to a comparator logic, the data portion of the second counter value.

13. The apparatus of claim 11, further comprising a comparator logic, implemented at least in part in hardware, to compare the data portion of the first counter value to the data portion of the second counter value, and to output a stall signal to the deskew control logic based on the comparison of the data portion of the first counter value to the data portion of the second counter value.

14. The apparatus of claim 11, wherein the comparator logic receives the data portion of the first counter value from the data storage logic and receives the data portion of the second counter value from the far counter operator logic.

15. A system comprising:
a data storage logic implemented at least in part in hardware to:
lookup an address portion of a first counter value based on an address portion of a second counter value, the first counter value representing a position in time of a first stream of data on a first multi-lane link compliant with a peripheral component interface express (PCIe) protocol (multi-lane PCIe link) and the second counter value representing a position in time of a second stream of data on a second multi-lane PCIe link, and
output a data portion of the first counter value based on the lookup; and
a deskew control logic implemented at least in part in hardware to:
compare the data portion of the first counter value to a data portion of a second counter value, and stall the first stream of data from transmission on the first multi-lane PCIe link based on the comparison.

16. The system of claim 15, wherein the deskew control logic stalls the first stream of data when the data portion of the first counter value is less than the data portion of the second counter value.

17. The system of claim 15, wherein the deskew control logic stalls the first stream of data according to a count difference between the data portion of the first counter value and the data portion of the second counter value.

18. The system of claim 15, further comprising a counter implemented at least in part in hardware to output running counter value to the deskew control logic, the running counter values used to identify a position of the first stream of data.

19. The system of claim 18, wherein the deskew control logic comprises further logic to:
   identify the first counter value based on the received running counter values from the counter, and
   transmit the first counter value to the data storage logic upon reception of a marker representing the first stream of deskewed data and upon the expiration of the running counter values.

20. The system of claim 15, wherein the system comprises a first counter operator logic implemented at least in part in hardware to:
   receive the first counter value from the deskew control logic,
   separate the address portion of the first counter value from the data portion of the first counter value, and
   transmit the address portion of the first counter value and the data portion of the first counter value to the data storage logic,
   wherein the address portion of the first counter value is used to lookup the data portion of the first counter value in the data storage logic.

21. The system of claim 20, wherein the system comprises a second counter operator logic implemented at least in part in hardware to:
   receive the second counter value from the deskew control logic,
   separate the address portion of the second counter value from the data portion of the second counter value, wherein the address portion of the second counter value is used to lookup the address portion of the first counter value in the data storage logic,
   transmit the address portion of the second counter value to the data storage logic, and
   transmit the data portion of the second counter value to a comparator logic.

22. The system of claim 15, wherein the deskew control logic comprises a comparator logic to:
   compare the data portion of the first counter value to the data portion of the second counter value;
   output an indication to the deskew control logic that the first stream and the second stream are deskewed when the data portion of the first counter value and the data portion of the second counter value are equal; and
   output an indication to the deskew control logic that the first stream of data should be stalled when the data portion of the first counter value is smaller than the data portion of the second counter value, and output a count difference between the data portion of the first counter value and the data portion of the second counter value.

* * * * *